(12) United States Patent
Broussard et al.

(10) Patent No.: US 6,605,658 B1
(45) Date of Patent: Aug. 12, 2003

(54) STABILIZING MIXTURES FOR ORGANIC POLYMERS COMPRISING A PYRAZOLONE, AN ORGANIC PHOSPHITE OR PHOSPHONITE AND A HINDERED PHENOL

(75) Inventors: Fabio Broussard, Brusaporto (IT); Daniele Girelli, Milan (IT); Maria Lucia Wis, Milan (IT); Carlo Neri, San Donato Milanese (IT); Vincenzo Malatesta, San Maurizio Al Lambro (IT)

(73) Assignee: Great Lakes Chemical (Europe) GmbH, Frauenfeld (CH)

( * ) Notice: Subject to any disclaimer, the term of this patent is extended or adjusted under 35 U.S.C. 154(b) by 5 days.

(21) Appl. No.: 09/721,229

(22) Filed: Nov. 22, 2000

(30) Foreign Application Priority Data

Nov. 23, 1999  (IT) .......................... MI99A2438

(51) Int. Cl.[7] ............................. C08K 5/3445
(52) U.S. Cl. ...................... 524/106; 252/403; 528/259; 528/341; 548/369.4
(58) Field of Search ................. 548/369.4; 524/106; 252/403; 528/259, 341

(56) References Cited

U.S. PATENT DOCUMENTS

| | | | |
|---|---|---|---|
| 2,458,780 A | * | 1/1949 | Howland |
| 3,325,445 A | * | 6/1967 | Harris et al. |
| 3,558,554 A | * | 1/1971 | Kuriyama et al. |
| 3,963,737 A | * | 6/1976 | Avar et al. |
| 4,146,540 A | * | 3/1979 | Avar et al. ................. 524/106 |
| 4,289,495 A | * | 9/1981 | Bugaut et al. ................. 8/406 |
| 4,360,617 A | | 11/1982 | Muller et al. |
| 4,874,391 A | * | 10/1989 | Reinert ........................ 8/442 |
| 5,079,285 A | | 1/1992 | Kluttz ........................ 524/106 |
| 5,210,118 A | * | 5/1993 | Scrima ....................... 524/106 |
| 5,318,851 A | * | 6/1994 | Baron et al. ................. 428/413 |
| 5,342,444 A | * | 8/1994 | Harnisch et al. |
| 5,457,143 A | * | 10/1995 | Scrima et al. .............. 524/106 |
| 5,510,467 A | * | 4/1996 | Kaul et al. ................... 534/728 |
| 5,917,004 A | * | 6/1999 | Liedloff ...................... 529/341 |

FOREIGN PATENT DOCUMENTS

| | | | |
|---|---|---|---|
| DE | 1912796 | * 10/1969 | |
| EP | 0 110 278 | 6/1984 | ......... C07D/231/20 |
| JP | 51-45151 | * 4/1976 | |
| JP | 36539 | * 4/1978 | ................. 524/106 |
| JP | 53-036539 | * 4/1978 | |

OTHER PUBLICATIONS

R Gächter/H. Müller (Ed.), "Plastic Additives Handbook" (10990), 3rd Ed., p. 47, Hanser, Münich.
R.H. Wiley and P. Wiley, "The Chemistry of Heterocyclic Compound" (1964) in the volume relating to "Pyrazolones, pyrazolidones and derivatives", Interscience Publisher, pp. 13–19.
Kirk–Othmer, "Encyclopedia of Chemical Technology" (1982), Vo. 19, 3rd Ed., pp. 445–453.
Houben–Weyl, "Methoden Der Organischen Chemie" (1964), vol. 10/2, pp. 614–640.
Gabutdinov, M.S. et al: "Light– and heat–stabilized LDPE or LDPE/HDPE compositions and preparation thereof", XP002175051 & RU 2 131 894 C (Kazanskoe Otkrytoe Aktsionernoe Obshchestvo "Organicheskii Sintz",RU) Jun. 20, 1999.
Kato, Hiroshi et al: "Heat stabilizers for ethylene poiymers", XP002175052 & JP 50 155549 A (Dainich–Nippon Cables Ltd., Japan; Daito Chemical Industry Col, Ltd.) Dec. 15, 1995.

\* cited by examiner

Primary Examiner—Peter Szekely
(74) Attorney, Agent, or Firm—Michael W. Ferrell

(57) ABSTRACT

Stabilizing mixtures for organic polymers comprising:
  a) at least one compound belonging to the group of pyrazolones;
  b) at least one compound belonging to the group of organic phosphites or phosphonites;
  c) at least one compound belonging to the group of sterically hindered phenols; and
  d) at least one compound belonging to the group of sterically hindered amines.

The above mixtures are useful in the stabilization to degradation caused by oxygen, heat and/or light, of organic polymers.

22 Claims, No Drawings

STABILIZING MIXTURES FOR ORGANIC POLYMERS COMPRISING A PYRAZOLONE, AN ORGANIC PHOSPHITE OR PHOSPHONITE AND A HINDERED PHENOL

The present invention relates to stabilizing mixtures for organic polymers.

More specifically, the present invention relates to stabilizing mixtures for organic polymers comprising at least one compound belonging to the group of pyrazolones, at least one compound belonging to the group of organic phosphites or phosphonites, at least one compound belonging to the group of sterically hindered phenols and, optionally, at least one compound belonging to the group of sterically hindered amines and their use in the stabilization to degradation caused by oxygen, heat and/or light, of organic polymers.

The present invention also relates to the polymeric compositions stabilized with the above stabilizing mixtures and the end-products obtained by their processing.

Japanese patent application 50/155549 describes the use of derivatives of pyrazolone as stabilizers to degradation caused by heat of ethylene polymers.

Japanese patent application 51/045151 describes the use of derivatives of pyrazolone as stabilizers to degradation caused by heat of resins based on polyvinylchloride.

Organic phosphites, organic phosphonites and phosphoramides are known in the art as co-stabilizers, secondary anti-oxidants and process stabilizers for organic polymers among which polyolefins. Examples of these compounds can be found, for example, in R. Gachter/H. Muller (Ed.), "Plastic Additives Handbook" (1990), 3$^{rd}$ Ed., page 47, Hanser, Muinich.

U.S. Pat. No. 4,360,617 describes stabilizing mixtures comprising symmetrical triarylphosphites and phenolic anti-oxidants, particularly useful in the stabilization to degradation caused by oxygen, heat and/or light, of various organic polymers such as, polyurethanes, polyacrylonitrile, polyamide 12 or polystyrene.

Sterically hindered amines, in particular those carrying 2,2,6,6-tetramethylpiperidine groups in the molecule, are known as HALS.

The known stabilizers, however, are not capable of completely satisfying all the problems to be solved by a stabilizer such as, for example, storage life, water absorption, sensitivity to hydrolysis, stabilization during the polymer processing, colour properties of the stabilized polymer, volatility, migration within the stabilized polymer, compatibility with the polymer to be stabilized and improvement in light protection. There is consequently a continuous need of stabilizers for organic polymers capable of providing a better stabilization of the same.

The Applicant has now found that stabilizing mixtures comprising at least one compound belonging to the group of pyrazolones, at least one compound belonging to the group of organic phosphites or phosphonites, at least one compound belonging to the group of sterically hindered phenols and, optionally, at least one compound belonging to the group of sterically hindered amines, are capable of providing a better stabilization to degradation caused by oxygen, heat and/or light, of the organic polymers to which they are added.

An object of the present invention therefore relates to stabilizing mixtures for organic polymers comprising:
 (a) at least one compound belonging to the group of pyrazolones;
 (b) at least one compound belonging to the group of organic phosphites or phosphonites;
 (c) at least one compound belonging to the group of sterically hindered phenols; and, optionally,
 (d) at least one compound belonging to the group of sterically hindered amines.

Compounds belonging to the group of pyrazolones (a) useful for the purposes of the present invention are selected from those having general formula (I) or (II):

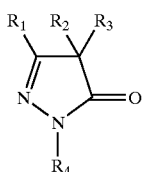

(I)

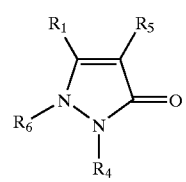

(II)

wherein:
 $R_1$ represents a hydrogen atom; a linear or branched $C_1$–$C_{18}$ alkyl group; a linear or branched $C_2$–$C_{18}$ alkenyl group; a linear or branched $C_2$–$C_{18}$ alkinyl group; a linear or branched $C_2$–$C_8$ alkoxyalkyl group; a $C_5$–$C_8$ cycloalkyl group, said cycloalkyl group optionally substituted; a heterocyclic group with 5 or 6 atoms containing at least one heteroatom selected from oxygen, nitrogen and sulfur, said heterocyclic group optionally substituted; a $C_6$–$C_{20}$ aryl group, said aryl group optionally substituted; an amine group having general formula (III):

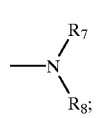

(III)

an acid or ester group having general formula (IV) or (V):

 (IV);

 (V);

$R_2$, $R_3$, $R_4$, $R_5$ and $R_6$, the same or different, represent a hydrogen atom; a linear or branched $C_1$–$C_{18}$ alkyl group; a linear or branched $C_2$–$C_{18}$ alkinyl group; a linear or branched $C_2$–$C_{18}$ alkenyl group; a $C_5$–$C_8$ cycloalkyl group, said cycloalkyl group optionally substituted; a $C_6$–$C_{20}$ aryl group optionally substituted;

or, $R_2$ and $R_3$, considered jointly with the carbon atom to which they are bound, represent a $C_5$–$C_8$ cycloalkyl group, said cycloalkyl group optionally substituted;

$R_7$, $R_8$, $R_9$ and $R_{10}$, the same or different, represent a hydrogen atom; a linear or branched $C_1$–$C_{18}$ alkyl group; a $C_5$–$C_8$ cycloalkyl group, said cycloalkyl group optionally substituted; a $C_6$–$C_{20}$ aryl group, said aryl group optionally substituted;

or, $R_7$ and $R_8$, considered jointly with the nitrogen atom to which they are bound, represent a heterocyclic group with 5 or 6 atoms optionally containing another heteroatom selected from oxygen, nitrogen and sulfur, said heterocyclic group optionally substituted.

When in general formula (I), $R_2$ and/or $R_3$ represent a hydrogen atom and in general formula (II), $R_6$ represents a hydrogen atom, said compounds having general formula (I) and (II) can be present as such, or in tautomeric equilibrium.

When the $C_5$–$C_{18}$ cycloalkyl groups, the $C_6$–$C_{20}$ aryl groups and the heterocyclic groups with 5 or 6 atoms are defined as optionally substituted, said groups are intended as being substituted with: halogen atoms selected from chlorine and bromine, linear or branched $C_1$–$C_{18}$ alkyl groups, linear or branched $C_1$–$C_{18}$ alkoxyl groups, linear or branched $C_2$–$C_{18}$ alkenyl groups, linear or branched $C_2$–$C_{18}$ alkinyl groups, OH groups, $NH_2$ groups, SH groups.

Examples of $C_1$–$C_{18}$ alkyl groups are: methyl, ethyl, propyl, isopropyl, butyl, octyl, etc.

Examples of $C_2$–$C_{18}$ alkenyl groups are: vinyl, propylene, butylene, pentylene, hexylene, etc.

Examples of $C_2$–$C_{18}$ alkinyl groups are: acetylene, propine, butine, 2-butine, etc.

Examples of $C_2$–$C_8$ alkoxyalkyl groups are: methoxyethyl, butoxyethyl, ethoxyethyl, etc.

Examples of $C_5$–$C_8$ cycloalkyl groups, optionally substituted are: cyclohexyl, cyclopentyl, methylcyclohexyl, etc.

Examples of heterocyclic groups with 5 or 6 atoms, optionally substituted, are: piperidine, morpholine, piperazine, tetramethylpiperidine, pentamethylpiperidine, etc.

Examples of $C_6$–$C_{20}$ aryl groups, optionally substituted, are: phenyl, naphthyl, anthracenyl, 2-hydroxyphenyl, benzyl, 2-phenylethyl, 4-t-butylbenzyl, etc.

Compounds belonging to the group of pyrazolones (a) of particular interest for the purposes of the present invention, but which in no way limit its scope, are:

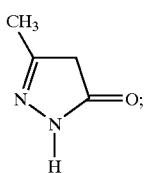
(Ia)

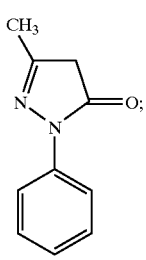
(Ib)

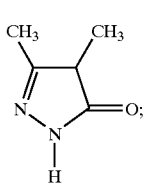
(Ic)

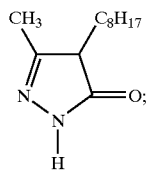
(Id)

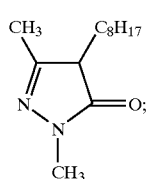
(Ie)

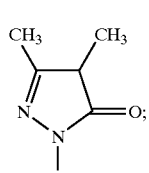
(If)

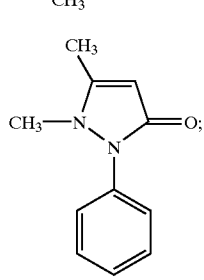
(Ig)

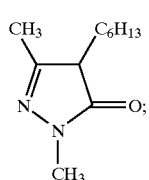
(Ih)

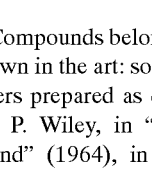
(Ii)

Compounds belonging to the group of pyrazolones (a) are known in the art: some are commercially available products, others prepared as described, for example, by R. H. Wiley and P. Wiley, in "The Chemistry of Heterocyclic Compound" (1964), in the volume relating to "Pyrazolones, pyrazolidones and derivatives", Interscience Publisher, pages 13–19; or in Kirk-Othmer, "Encyclopedia of Chemical Technology" (1982), Vol. 19, $3^{rd}$ Ed., pages 445–453; or in Houben-Weyl, "Methoden Der Organischen Chemie" (1964), Vol. 10/2, pages 614–640.

Compounds belonging to the group of organic phosphites or phosphonites (b) useful for the purposes of the present invention are selected from those having the following general formulae (VI)–(XII):

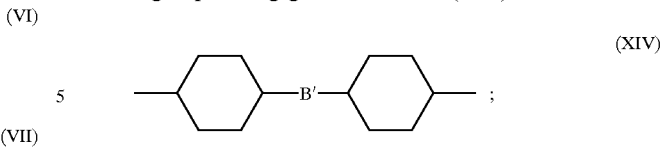

(VI)

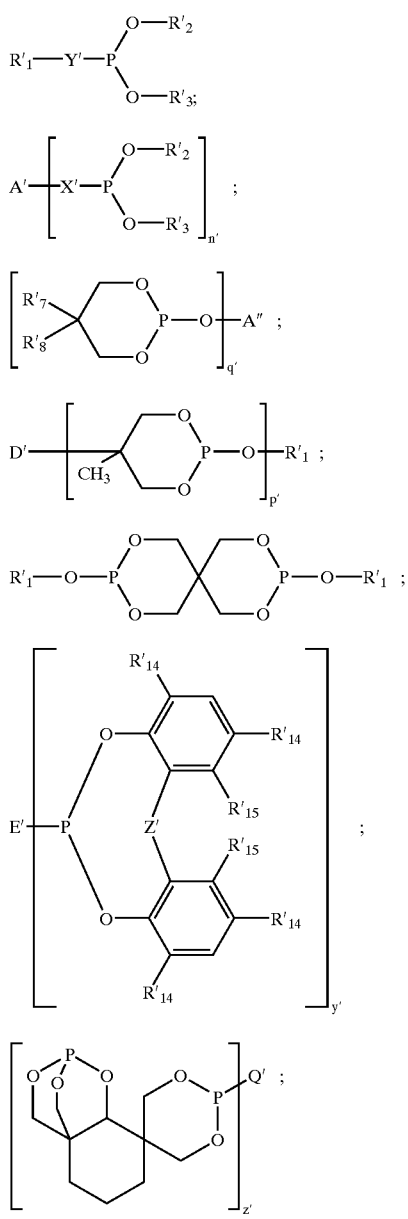

(VII)

(VIII)

(IX)

(X)

(XI)

(XII)

wherein:
n' is 2, 3 or 4;
p' is 1 or 2;
q' is 2 or 3;
r' is an integer ranging from 4 to 12, extremes included;
y' is 1, 2 or 3;
z' is an integer ranging from 1 to 6, extremes included;
when n' is 2, A' represents a $C_2$–$C_{18}$ alkylene group; a $C_2$–$C_{12}$ alkylene group containing an oxygen atom, a sulfur atom, or an —NR'$_4$— group; a group having general formula (XIII):

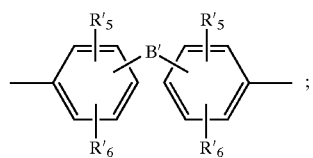

(XIII)

a group having general formula (XIV):

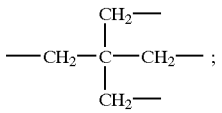

(XIV)

a phenylene group;
when n' is 3, A' represents a group having general formula —$C_{r'}H_{2r'-1}$— wherein r' has the same values described above;
when n' is 4, A' represents a group having the formula:

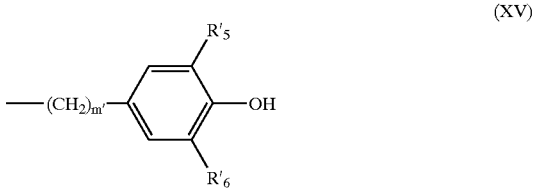

A'' has the same meanings defined above for A' when n' is 2;
B' represents a direct bond; one of the following groups: —CH$_2$—, —CHR'$_4$—, —CR'$_1$R'$_4$—; a sulfur atom; a $C_5$–$C_7$ cycloalkylidene group; a cyclohexylidene group substituted with 1–4 $C_1$–$C_4$ alkyl groups in position 3, 4 and/or 5;
when p' is 1, D' represents a methyl group; and, when p' is 2, D' represents a —CH$_2$OCH$_2$— group;
when y' is 1, E' represents a $C_1$–$C_{18}$ alkyl group; an —OR'$_1$ group; a halogen atom;
when y' is 2, E' represents an —O—A''—O— group;
when y' is 3, E' represents one of the following groups: R'$_4$C(CH$_2$O—)$_3$, N(CH$_2$CH$_2$O—)$_3$;
Q' represents a radical of an alcohol or a phenol with a valence z', said radical being bound to the phosphorous atom by means of an oxygen atom;
R'$_1$, R'$_2$ and R'$_3$, each independently, represent a hydrogen atom; a halogen atom; one of the following groups: —COOR'$_4$—, —CN—, —CONR'$_4$R'$_4$; a $C_2$–$C_{18}$ alkyl group containing an oxygen atom, a sulfur atom, an —NR'$_4$— group; a $C_7$–$C_9$ phenylalkyl group; a $C_5$–$C_{12}$ cycloalkyl group; a phenyl group or a naphthyl group, said phenyl or naphthyl groups optionally substituted with halogen atoms, or with 1–3 $C_1$–$C_{18}$ alkyl or alkoxyl groups or with $C_7$–$C_9$ phenylalkyl groups; or they represent a group having general formula (XV):

(XV)

wherein m' represents an integer ranging from 3 to 6, extremes included;
R'$_4$ represents a hydrogen atom; a $C_1$–$C_{18}$ alkyl group; a $C_5$–$C_{12}$ cycloalkyl group; a $C_7$–$C_9$ phenylalkyl group;
R'$_5$ and R'$_6$, each independently, represent a hydrogen atom; a $C_1$–$C_8$ alkyl group; a $C_5$–$C_6$ cycloalkyl group;
when q' is 2, R'$_7$ and R'$_8$, each independently, represent a $C_1$–$C_4$ alkyl group; or, considered jointly, they represent a 2,3-dihydropentamethylene group;

when q' is 3, $R'_7$ and $R'_8$ represent a methyl group;

$R'_{14}$ represents a hydrogen atom; a $C_1$–$C_9$ alkyl group; a cyclohexyl group;

$R'_{15}$ represents a hydrogen atom; a methyl group; or, when two or more $R'_{14}$ and $R'_{15}$ groups are present, said groups are the same or different to each other;

X' and Y' represent a direct bond; an oxygen atom;

Z' represents a direct bond; a methylene group; a —C($R'_{16}$)$_2$— group; a sulfur atom;

$R'_{16}$ represents a $C_1$–$C_8$ alkyl group.

Compounds belonging to the group of organic phosphites or phosphonites (b) of particular interest for the purposes of the present invention are those having general formula (VI), (VII), (X) and (XI) wherein:

n' is 2 and y' is 1, 2 or 3;

A' represents a $C_2$–$C_{18}$ alkylene group; a p-phenylene or p-bisphenylene group;

when y' is 1, E' represents a $C_1$–$C_{18}$ alkyl group; an —OR'— group, a fluorine atom;

when y' is 2, E' represents a p-bisphenylene group;

when y' is 3, E' represents an N(CH$_2$CH$_2$O—)$_3$ group;

$R'_1$, $R'_2$ and $R'_3$, each independently represent a $C_1$–$C_{18}$ alkyl group; a $C_7$–$C_9$ phenylalkyl group; a cyclohexyl group; a phenyl group; said phenyl group optionally substituted with 1–3 $C_1$–$C_{18}$ alkyl groups;

$R'_{14}$ represents a hydrogen atom; a $C_1$–$C_9$ alkyl group;

$R'_{15}$ represents a hydrogen atom; a methyl group;

X' represents a direct bond;

Y' represents an oxygen atom;

Z' represents a direct bond; a —CH($R'_{16}$)— group;

$R'_{16}$ represents a $C_1$–$C_4$ alkyl group.

Similarly, compounds belonging to the group of organic phosphites or phosphonites (b) of particular interest for the purposes of the present invention are those having general formula (VI), (VII), (X) and (XI) wherein:

n' is 2 and y' is 1 or 3;

A' represents a p-bisphenylene group;

when y' is 1, E' represents a $C_1$–$C_{18}$ alkoxyl group; a fluorine atom;

when y' is 3, E' represents an N(CH$_2$CH$_2$O—)$_3$ group;

$R'_1$, $R'_2$ and $R'_3$, each independently, represent a $C_1$–$C_{18}$ alkyl group; a phenyl group substituted with 2–3 $C_2$–$C_{12}$ alkyl groups;

$R'_{14}$ represents a methyl group; a t-butyl group;

$R'_{15}$ represents a hydrogen atom;

X' represents a direct bond;

Y' represents an oxygen atom;

Z' represents a direct bond; a methylene group; a —CH(CH$_3$)— group.

Preferred compounds belonging to the group of organic phosphites or phosphonites (b) for the purposes of the present invention are those having general formula (VI), (VII) and (XI); particularly preferred are those having general formula (XVI):

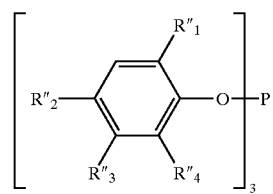

(XVI)

wherein:

$R''_1$ and $R''_2$, each independently, represent a hydrogen atom; a $C_1$–$C_8$ alkyl group; a cyclohexyl group; a phenyl group;

$R''_3$ and $R''_4$, each independently, represent a hydrogen atom; a $C_1$–$C_4$ alkyl group.

Specific examples of compounds belonging to the group of phosphites or phosphonites (b) useful for the purposes of the present invention are: triphenyl phosphite; diphenyl alkyl phosphites; phenyl dialkyl phosphites; tris (nonylphenyl)phosphite (known under the trade-name of Alkanox™ TNPP of Great Lakes Chemical Corporation); trilauryl phosphite; trioctadecyl phosphite; distearyl pentaerythritol diphosphite; tris(2,4-di-t-butylphenyl)phosphite (known under the trade-name of Alkanox™ 240 of Great Lakes Chemical Corporation); diisodecyl pentaerythritol diphosphite; bis(2,4-di-t-butylphenyl)pentaerythritol diphosphite (known under the trade-name of Alkanox™ P24 of Great Lakes Chemical Corporation); bis(2,6-di-t-butyl-4-methylphenyl)pentaerythritol diphosphite; bis-isodecyloxypentaerythritol diphosphite, bis(2,4-di-t-butyl-6-methylphenyl)pentaerythritol diphosphite; bis(2,4,6-tris-t-butylphenyl)pentaerythritol diphosphite; tristearylsorbitol triphosphite; tetra-kis(2,4-di-t-butylphenyl)-4,4'-diphenylenediphosphonite (known under the trade-name of Alkanox™ 24-44 of Great Lakes Chemical Corporation); 6-iso-octyloxy-2,4,8,10-tetra-t-butyl-12H-dibenzo-[d,g]-1,3,2-dioxaphosphocine; 6-fluoro-2,4,8,10-tetra-t-butyl-12-methyldibenzo[d,g]-1,3,2-dioxaphosphocine; bis(2,4-di-t-butyl-6-methylphenyl)methyl phosphite; bis-(2,4-di-t-butyl-6-methylphenyl)ethyl phosphite diphosphite (known under the trade-name of Irgafos® 38 of Ciba Specialty Chemicals); bis(2,4-dicu-mylphenyl)pentaerythritol diphosphite.

Specific examples of particularly preferred compounds belonging to the group of organic phosphites or phosphonites (b) for the purposes of the present invention are: tris(2,4-di-t-butylphenyl)phosphite (known under the trade-name of Alkanox™ 240 of Great Lakes Chemical Corporation); tris(nonylphenyl)phosphite (known under the trade-name of Alkanox™ TNPP of Great Lakes Chemical Corporation); 6-fluoro-2,4,8,10-tetra-t-butyl-12-methyldibenzo[d,g]-1,3,2-dioxaphosphocine; 6-isooctyloxy-2,4,8,10-tetra-t-butyl-12H-dibenzo-[d,g]-1,3,2-dioxaphosphocine; bis(2,4-di-t-butylphenyl) pentaerythritol diphosphite (known under the trade-name of Alkanox™ P24 of Great Lakes Chemical Corporation); bis(2,6-di-t-butyl-4-methylphenyl)pentaerythritol diphosphite; bis-(2,4-di-t-butyl-6-methylphenyl)ethyl phosphite (known under the trade-name of Irgafos® 38 of Ciba Specialty Chemicals); bis-(2,4-dicumylphenyl)pentaerythritol diphosphite; tetrakis (2, 4-di-t-butylphenyl)-4,4'-diphenylenediphosphonite (known under the trade-name of Alkanox™ 24-44 of Great Lakes Chemical Corporation); triphosphite having formula (XVII):

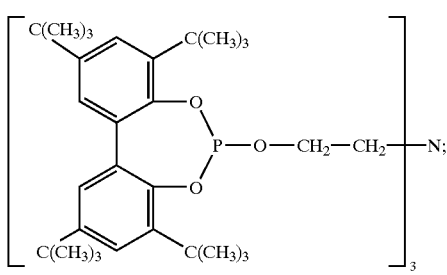

(XVII)

diphosphite having general formula (XVIII):

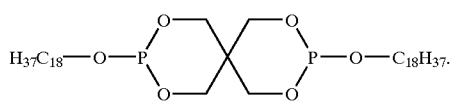

(XVIII)

Specific examples of compounds belonging to the group of organic phosphites or phosphonites (b) even more preferred for the purposes of the present invention are: tris(2,4-di-t-butylphenyl)phosphite (known under the trade-name of Alkanox™ 240 of Great Lakes Chemical Corporation); bis-(2,4-di-t-butyl-6-methylphenyl)ethyl phosphite (known under the trade-name of Irgafos® 38 of Ciba Specialty Chemicals); tetrakis(2,4-di-t-butylphenyl)-4,4'-diphenylenediphosphonite (known under the trade-name of Alkanox™ 24-44 of Great Lakes Chemical Corporation); bis(2,4-dicumylphenyl)pentaerythritol diphosphite.

The compounds belonging to the group of organic phosphites or phosphonites (b) described above are known compounds; many of them are commercially available compounds.

Compounds belonging to the group of sterically hindered phenols (c) useful for the purposes of the present invention are selected from those having general formula (XIX):

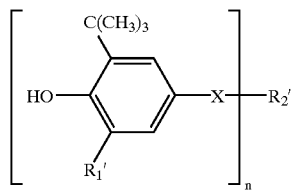

(XIX)

wherein:
$R_1'$ represents a $C_1$–$C_4$ alkyl group;
n is 1, 2, 3 or 4;
X represents a methylene group; or a group having general formula (XX) or (XXI):

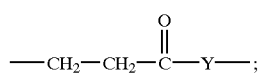

(XX)

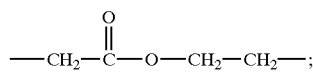

(XXI)

Y represents an oxygen atom; an —NH— group;
when n is 1, X represents a group having general formula (XX) wherein Y is attached to $R_2'$ and $R_2'$ represents a $C_1$–$C_{25}$ alkyl group;

when n is 2, X represents a group having general formula (XX) wherein Y is attached to $R_2'$ and $R_2'$ represents a $C_2$–$C_{12}$ alkylene group; a $C_4$–$C_{12}$ alkylene group containing one or more oxygen or sulfur atoms; or, when Y represents an —NH— group, $R_2'$ represents a direct bond;

when n is 3, X represents a methylene group; a group having general formula (XXI) wherein the ethylene group is bound to $R_2'$ and $R_2'$ represents a group having formula (XXII):

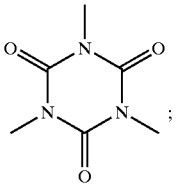

(XXII)

when n is 4, X represents a group having general formula (XX) wherein Y is bound to $R_2'$ and $R_2'$ represents a $C_4$–$C_{10}$ alkane-tetrayl group.

Examples of linear or branched alkyl groups having up to 25 carbon atoms are: methyl, ethyl, propyl, isopropyl, n-butyl, s-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or doicosyl, etc.

$R_1'$ preferably represents methyl or t-butyl.

$R_2'$ preferably represents a $C_1$–$C_{20}$ alkyl group, particularly a $C_1$–$C_{18}$ alkyl group, for example, a $C_4$–$C_{18}$ alkyl group. Even more preferably, $R_2'$ represents a $C_8$–$C_{18}$ alkyl group, particularly a $C_{14}$–$C_{18}$ alkyl group, for example octadecyl.

Examples of linear or branched $C_2$–$C_{12}$ alkylene groups, are: ethylene, propylene, tetramethylene, pentamethylene, hexamethylene, heptamethylene, octamethylene, decamethylene, dodecamethylene, etc.

$R_2'$ preferably represents a $C_2$–$C_{10}$ alkylene group, particularly a $C_2$–$C_8$ alkylene group. Even more preferably, $R_2'$ represents a $C_4$–$C_8$ alkylene group, particularly a $C_4$–$C_6$ alkylene group, for example hexamethylene.

Examples of $C_4$–$C_{12}$ alkylene groups containing one or more oxygen or sulfur atoms, are: —$CH_2$—O—$CH_2CH_2$—O—$CH_2$—, —$CH_2$—(O—$CH_2CH_2$)$_2$—O—$CH_2$—, —$CH_2$—(O—$CH_2CH_2$)$_3$—O—$CH_2$—, —$CH_2$—(O—$CH_2CH_2$)$_4$—O—$CH_2$—, —$CH_2$—$CH_2$—O—$CH_2CH_2$—O—$CH_2CH_2$—, —$CH_2$—$CH_2$—S—$CH_2CH_2$—, etc.

$R_2'$ preferably represents a $C_4$–$C_{10}$ alkylene group containing one or more oxygen or sulfur atoms, particularly a $C_4$–$C_8$ alkylene group containing one or more oxygen or sulfur atoms, for example a $C_4$–$C_6$ alkylene group containing one or more oxygen or sulfur atoms. Even more preferably, $R_2'$ represents one of the following groups: —$CH_2$—$CH_2$—O—$CH_2CH_2$—O—$CH_2CH_2$—, —$CH_2$—$CH_2$—S—$CH_2CH_2$—.

Examples of $C_4$–$C_{10}$ alkane-tetrayl groups are:

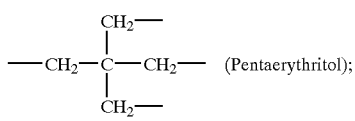 (Pentaerythritol);

—CH$_2$—CH—CH—CH$_2$—;

—CH$_2$—CH$_2$—CH—CH—CH$_2$—;

—CH$_2$—CH$_2$—CH—CH—CH$_2$—CH$_2$—;

—CH$_2$—CH$_2$—CH—CH$_2$—CH—CH$_2$—CH$_2$—;

—CH$_2$—CH$_2$—CH—CH$_2$—CH$_2$—CH—CH$_2$—CH$_2$—;

etc. Pentaerythritol is preferred.

Specific examples of compounds belonging to the group of sterically hindered-phenols (c) useful for the purposes of the present invention are those wherein, in general formula (XIX), when n is 1, $R_2'$ represents a $C_1$–$C_{20}$ alkyl group.

Specific examples of preferred compounds belonging to the group of sterically hindered phenols (c) useful for the purposes of the present invention are those wherein, in general formula (XIX), when n is 2, $R_2'$ represents a $C_2$–$C_8$ alkylene group, or a $C_4$–$C_8$ alkylene group containing one or more oxygen or sulfur atoms; or, when Y represents an —NH— group, $R_2'$ represents a direct bond; and, when n is 4, $R_2'$ represents a $C_4$–$C_8$ alkane-tetrayl group.

Similarly, examples of preferred compounds belonging to the group of sterically hindered phenols (c) preferred for the purposes of the present invention are those wherein, in general formula (XIX), $R_1'$ represents methyl or t-butyl; n is 1, 2 or 4; X represents a group having general formula (XX); Y represents an oxygen atom or an —NH— group; and, when n is 1, $R_2'$ represents a $C_{14}$–$C_{18}$ alkyl group; and, when n is 2, $R_2'$ represents a $C_4$–$C_6$ alkylene group, or a $C_4$–$C_6$ alkylene group containing one or more oxygen or sulfur atoms; and, when n is 4, $R_2'$ represents a $C_4$–$C_6$ alkane-tetrayl group.

Similarly, of interest for the purposes of the present invention are compounds belonging to the group of sterically hindered phenols (c) having general formula (XIX), selected from: N,N'-hexamethylene bis[3-(3,5-di-t-butyl-4-hydroxyphenyl)propionamide] (known under the trade-name of Lowinox® HD-98 of Great Lakes Chemical Corporation); octadecyl 3-(3',5'-di-t-butyl-4'-hydroxyphenyl)propionate (known under the trade-name of Anox™ PP18 of Great Lakes Chemical Corporation); tetrakismethylene-(3,5-di-t-butyl-4-hydroxyhydrocinnamate)methane (known under the trade-name of Anox™ 20 of Great Lakes Chemical Corporation); triethylene glycol bis[3-(3-t-butyl-4-hydroxy-5-methylphenyl)propionate] (known under the trade-name of Lowinox® GP-45 of Great Lakes Chemical Corporation); 2,2'-thiodiethylene bis[3(3,5-di-t-butyl-4-hydroxyphenyl)propionate] (known under the trade-name of Anox™ 70 of Great Lakes Chemical Corporation); 1,3,5-tris(3,5-di-t-butyl-4-hydroxybenzyl)isocyanurate (known under the trade-name of Anox™ IC-14 of Great Lakes Chemical Corporation); the compound having the formula:

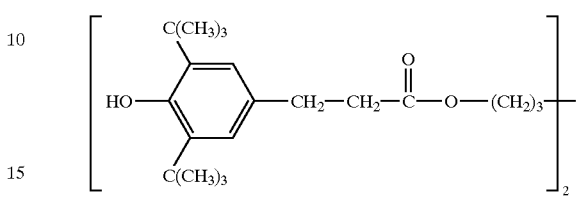

(known under the trade-name of Irganox® 259 of Ciba Specialty Chemicals); the compound having the formula:

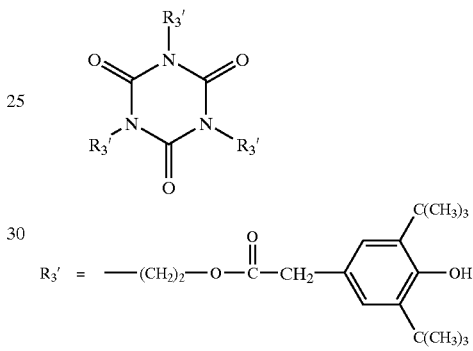

(known under the trade-name of Irganox® 3125 of Ciba Specialty Chemicals).

Also of interest for the purposes of the present invention are compounds belonging to the group of sterically hindered phenols (c) consisting of reactive antioxidizing compounds containing a sterically hindered phenol group having general formula (I') or (I'a):

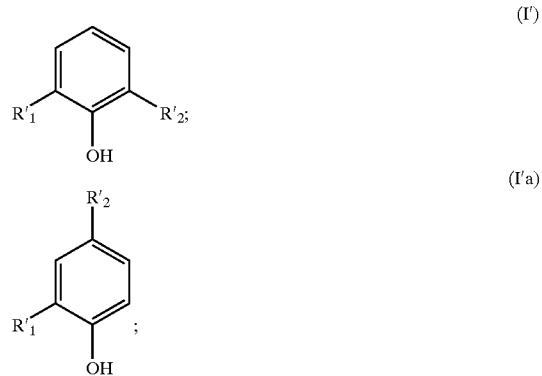

more specifically, reactive anti-oxidizing compounds containing sterically hindered phenol groups having general formula (I') or (I'a) useful for the purposes of the present invention, are selected from those having general formula (II') or (II'a):

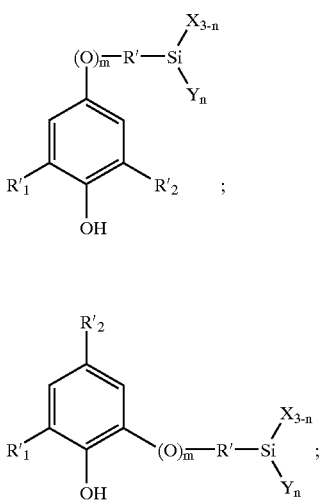

(II')

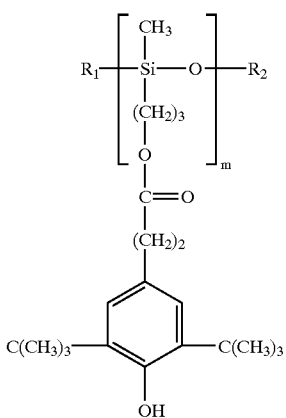

(II'a)

said reactive anti-oxidizing compounds containing sterically hindered phenol groups having general formula (I'), (I'a), (II') and (II'a), are described in European patents EP 162,523 and EP 182,415 which must be considered as forming an integrant part of the present patent application. The above reactive anti-oxidizing compounds may produce complex resinous structures by means of hydrolysis and condensation of the hydrolyzable silicic function.

A specific example of the above reactive anti-oxidizing compounds is the following compound having general formula (II''):

(II'')

[structure showing R₁—Si(CH₃)(—O—)—R₂ with (CH₂)₃, O, C=O, (CH₂)₂, phenol with C(CH₃)₃ groups and OH]

consisting of a mixture of linear oligomers wherein $R_1=OH$ and $R_2=H$, and cyclic oligomers wherein $R_1$ and $R_2$ represent a direct bond, having a number average molecular weight equal to 3,900.

As described above, the compounds belonging to the group of sterically hindered phenols (c) are known compounds and, in some cases, are commercially available. Or, said compounds, can be prepared according to processes described, for example, in patents U.S. Pat. No. 3,330,859, U.S. Pat. No. 3,960,928, or in European patents EP 162,523 and EP 182,415.

Compounds belonging to the group of sterically hindered amines (d) useful for the purposes of the present invention are selected from those comprising at least one group having general formula (XXIII) or (XXIV):

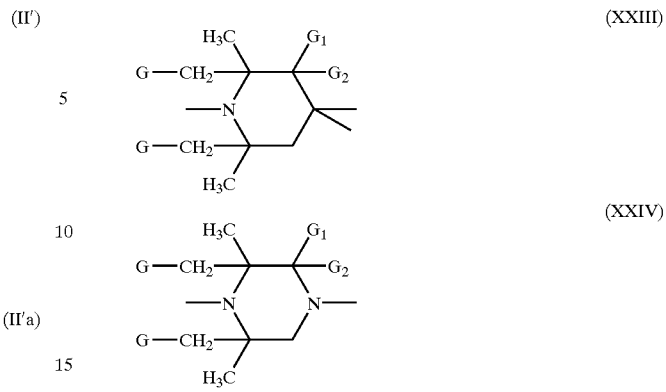

wherein:
G represents a hydrogen atom; or a methyl group;
$G_1$ and $G_2$, the same or different, represent a hydrogen atom; a methyl group; or, they jointly represent an oxygen atom.

Of particular interest for the purposes of the present invention are compounds belonging to the group of sterically hindered amines (d) selected from compounds (a')–(h') which comprise at least one group having general formula (XXIII) or (XXIV).

(a') Compounds having general formula (XXV):

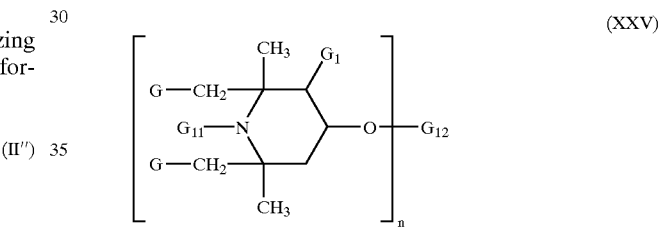

wherein n is a number ranging from 1 to 4, extremes included; G and $G_1$, independently represent a hydrogen atom or a methyl; $G_{11}$ represents a hydrogen atom, O, a hydroxyl group, an NO group, a —CH₂CN group, a $C_1$–$C_{18}$ alkyl group, a $C_3$–$C_8$ alkenyl group, a $C_3$–$C_8$ alkinyl group, a $C_7$–$C_{12}$ arylalkyl group, a $C_1$–$C_{18}$ alkoxyl group, a $C_5$–$C_8$ cycloalkoxyl group, a $C_7$–$C_9$ phenylalkoxyl group, a $C_1$–$C_8$ alkanoyl group, a $C_3$–$C_5$ alkenoyl group, a $C_1$–$C_{18}$ alkanoyloxyl group, a benzyloxyl group, a glycidyl group, an $OG_{11}'$ group, wherein $G_{11}'$ represents a linear or branched $C_1$–$C_{10}$ alkyl group; a —CH₂CH(OH)—Z group wherein Z represents a hydrogen atom, a methyl, or a phenyl, $G_{11}$ preferably being hydrogen, a $C_1$–$C_4$ alkyl group, an allyl, a benzyl, an acetyl or an acryloyl; $G_{12}$, when n is 1, represents a hydrogen atom, a $C_1$–$C_{18}$ alkyl group, said alkyl group optionally containing one or more oxygen atoms, a cyanoethyl group, a benzyl, a glycidyl group, a monovalent radical of a carboxylic acid, of a carbamic acid or of an acid containing phosphorous, aliphatic, cycloali-phatic or arylaliphatic, unsaturated or aromatic, or a monovalent silyl radical, preferably a radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms, of an aromatic carboxylic acid having from 7 to 15 carbon atoms, said carboxylic acids optionally substituted in the aliphatic, cycloaliphatic or aromatic part, with 1–3 —COOZ₁₂ groups wherein $Z_{12}$ represents a hydrogen atom, a $C_1$–$C_{20}$ alkyl group, a $C_3$–$C_{12}$ alkenyl group, a $C_5$–$C_7$ cycloalkyl group, a phenyl or a benzyl; $G_{12}$, when n is 2, represents a $C_2$–$C_{12}$ alkylene group, a $C_4$–$C_{12}$ alkenylene group, a xylylene group, a divalent radical of a dicarboxylic acid, of a dicarbamic acid or of an acid containing phosphorous, aliphatic, cycloaliphatic, arylaliphatic or aromatic, or a divalent silyl radical, preferably a radical of an aliphatic dicarboxylic acid having from 2 to 36 carbon atoms, of a cycloaliphatic or aromatic dicarboxylic acid having from 8 to 14 carbon atoms, of an aliphatic, cycloaliphatic or aromatic dicarbamic acid, having from 8 to 14 carbon atoms, said dicarboxylic acids optionally substituted in the aliphatic, cycloaliphatic or aromatic part, with 1 or 2 —COOZ$_{12}$ groups wherein $Z_{12}$ has the same meanings defined above; $G_{12}$, when n is 3, represents a trivalent radical of an aliphatic, cycloaliphatic or aromatic tricarboxylic acid, optionally substituted in the aliphatic, cycloaliphatic or aromatic part, with a —COOZ$_{12}$ group wherein $Z_{12}$ has the same meanings defined above, or of an aromatic tricarbamic acid or of an acid containing phosphorous, or it represents a trivalent silyl radical; $G_{12}$, when n is 4, is a tetravalent radical of an aliphatic, cycloaliphatic or aromatic tetracarboxylic acid.

Radicals of tetracarboxylic acids comprise, in all cases, radicals having the formula (—CO)$_n$R wherein n has the same meaning described above and R can be easily deduced from the above definition.

Examples of $C_1$–$C_{12}$ alkyl groups are: methyl, ethyl, n-propyl, n-butyl, s-butyl, t-butyl, n-hexyl, n-octyl, 2-ethylhexyl, n-nonyl, n-decyl, n-undecyl, n-dodecyl, etc.

Examples of $G_{11}$ and $G_{12}$ substituents, when they represent a $C_1$–$C_{18}$ alkyl group, are: in addition to the groups described above: n-tridecyl, n-tetradecyl, n-hexadecyl, n-octadecyl, etc.

Examples of the $G_{11}$ substituent, when it represents a $C_3$–$C_8$ alkenyl group, are: 1-propenyl, allyl, methallyl, 2-butenyl, 2-pentenyl, 2-hexenyl, 2-octenyl, 4-t-butyl-2-butenyl, etc.

When the $G_{11}$ substituent represents a $C_3$–$C_8$ alkinyl group, it is preferably propargyl.

When the $G_{11}$ substituent represents a $C_7$–$C_{12}$ arylalkyl group, it is, in particular, phenethyl, preferably benzyl.

Examples of the $G_{11}$ substituent, when it represents a $C_1$–$C_8$ alkanoyl group, are: formyl, propionyl, butyryl, octanoyl, preferably acetyl and, when it represents a $C_3$–$C_5$ alkenoyl group, preferably acryloyl.

Examples of the $G_{12}$ substituent, when it represents a monovalent radical of a carboxylic acid, are radicals of the following acids: acetic, caproic, stearic, acrylic, methacrylic, benzoic, β-(3,5-di-t-butyl-4-hydroxyphenyl)propionic, etc.

An example of the $G_{12}$ substituent, when it represents a monovalent silyl radical, is: a radical having general formula —($C_jH_{2j}$)—Si(Z')$_2$Z" wherein j is an integer ranging from 2 to 5, extremes included, and Z' and Z", each independently, represent a $C_1$–$C_4$ alkyl group or a $C_1$–$C_4$ alkoxyl group.

Examples of the $G_{12}$ substituent, when it represents a divalent radical of a dicarboxylic acid, are radicals of the following acids: malonic, succinic, glutaric, adipic, suberic, sebacic, maleic, itaconic, phthalic, dibutylmalonic, dibenzylmalonic, butyl(3,5-di-t-butyl-4-hydroxybenzyl)malonic, bicycloheptenedicarboxylic, etc.

Examples of the $G_{12}$ substituent, when it represents a trivalent radical of a tricarboxylic acid, are radicals of the acids: trimellitic, citric, nitrilotriacetic, etc.

Examples of the $G_{12}$ substituent, when it represents a tetravalent radical of a tetracarboxylic acid, are radicals of the following acids: butane-1,2,3,4-tetracarboxylic, pyromellitic, etc.

Examples of the $G_{12}$ substituent, when it represents a divalent radical of a dicarbamic acid, are radicals of the following acids: hexamethylenedicarbamic, 2,4-toluylenedicarbamic, etc.

Compounds having general formula (XXV) wherein G represents a hydrogen atom, $G_{11}$ represents a hydrogen atom or a methyl, n is 2 and $G_{12}$ represents a diacyl radical of an aliphatic dicarboxylic acid having from 4 to 12 carbon atoms, are preferred.

Specific examples of polyalkylpiperidines having general formula (XXV) are:

1) 4-hydroxy-2,2,6,6-tetramethylpiperidine;
2) 1-allyl-4-hydroxy-2,2,6,6-tetramethylpiperidine;
3) 1-benzyl-4-hydroxy-2,2,6,6-tetramethylpiperidine;
4) 1-(4-t-butyl-2-butenyl)-4-hydroxy-2,2,6,6-tetramethylpiperidine;
5) 4-stearyloxy-2,2,6,6-tetramethylpiperidine;
6) 1-ethyl-4-salicyloyloxy-2,2,6,6-tetramethylpiperidine;
7) 4-methacryloyloxy-1,2,2,6,6-pentamethylpiperidine;
8) 1,2,2,6,6-pentamethylpiperidin-4-yl-β-(3,5-di-t-butyl-4-hydroxyphenyl)propionate;
9) di(1-benzyl-2,2,6,6-tetramethylpiperidin-4-yl)maleate;
10) di(2,2,6,6-tetramethylpiperidin-4-yl)succinate;
11) di(2,2,6,6-tetramethylpiperidin-4-yl)glutarate;
12) di(2,2,6,6-tetramethylpiperidin-4-yl)adipate;
13) di(2,2,6,6-tetramethylpiperidin-4-yl)sebacate;
14) di(1,2,2,6,6-pentamethylpiperidin-4-yl)sebacate;
15) di(1,2,3,6-tetramethyl-2,6-diethylpiperidin-4-yl)sebacate;
16) di(1-allyl-2,2,6,6-tetramethylpiperidin-4-yl)phthalate;
17) 1-hydroxy-4-β-cyanoethyloxy-2,2,6,6-tetramethylpiperidine;
18) (1-acetyl-2,2,6,6-tetramethylpiperidin-4-yl)acetate;
19) tris(2,2,6,6-tetramethylpiperidin-4-yl)trimellitate;
20) 1-acryloyl-4-benzyloxy-2,2,6,6-tetramethylpiperidine;
21) di(2,2,6,6-tetramethylpiperidin-4-yl)diethylmalonate;
22) di(1,2,2,6,6-pentamethylpiperidin-4-yl)dibutylmalonate;
23) di(1,2,2,6,6-pentamethylpiperidin-4-yl)butyl-(3,5-di-tert-butyl-4-hydroxybenzyl)malonate;
24) di(1-octyloxy-2,2,6,6-tetramethylpiperidin-4-yl)sebacate;
25) di(1-cyclohexyloxy-2,2,6,6-tetramethylpiperidin-4-yl)sebacate;
26) hexane-1',6'-bis(4-carbamoyloxy-1-n-butyl-2,2,6,6-tetramethylpiperidine);
27) toluene-2',4'-bis(4-carbamoyloxy-1-n-propyl-2,2,6,6-tetramethylpiperidine);
28) dimethyl-bis(2,2,6,6-tetramethylpiperidin-4-oxy)silane;
29) phenyl-tris(2,2,6,6-tetramethylpiperidin-4-oxy)silane;
30) tris(1-propyl-2,2,6,6-tetramethylpiperidin-4-yl)phosphite;
31) tris(1-propyl-2,2,6,6-tetramethylpiperidin-4-yl)phosphate;
32) bis(1,2,2,6,6-pentamethylpiperidin-4-yl)phenylphosphonate;
33) 4-hydroxy-1,2,2,6,6-pentamethylpiperidine;

34) 4-hydroxy-N-hydroxyethyl-2,2,6,6-tetramethylpiperidine;
35) 4-hydroxy-N-(2-hydroxypropyl)-2,2,6,6-tetramethylpiperidine;
36) 1-glycidyl-4-hydroxy-2,2,6,6-tetramethylpiperidine.

(b') Compounds having general formula (XXVI):

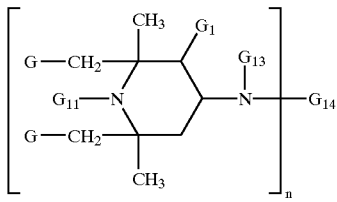

(XXVI)

wherein n is 1 or 2; G, $G_1$ and $G_{11}$ have the same meanings described above under point (a'); $G_{13}$ represents a hydrogen atom, a $C_1$–$C_{12}$ alkyl group, a $C_2$–$C_5$ hydroxyalkyl group, a $C_5$–$C_7$ cycloalkyl group, a $C_7$–$C_8$ arylalkyl group, a $C_2$–$C_{18}$ alkanoyl group, a $C_3$–$C_5$ alkenoyl group, a benzoyl group, or a group having the following general formula:

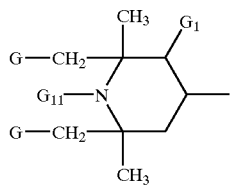

wherein G, $G_1$ and $G_{11}$ have the same meanings defined above under point (a') $G_{14}$, when n is 1, represents a hydrogen atom, a $C_1$–$C_{18}$ alkyl group, a $C_3$–$C_8$ alkenyl group, a $C_5$–$C_7$ cycloalkyl group, a $C_1$–$C_4$ alkyl group substituted with a hydroxyl group, with a cyano group, with an alkoxycarbonyl group or with a carbamide group, a glycidyl group, a group having the formula —$CH_2$—CH(OH)—Z or a group having the formula —CONH—Z wherein Z represents a hydrogen atom, a methyl or a phenyl; $G_{14}$, when n is 2, represents a $C_2$–$C_{12}$ alkylene group, a $C_6$–$C_{12}$ arylene group, a xylylene group, a group having the formula —$CH_2$—CH(OH)—$CH_2$— or a group having the formula —$CH_2$—CH(OH)—$CH_2$—O—D—O wherein D represents a $C_2$–$C_{10}$ alkylene group, a $C_6$–$C_{15}$ arylene group, a $C_6$–$C_{12}$ cycloalkylene group; or, on the condition that $G_{13}$ does not represent an alkanoyl group, an alkenoyl group or a benzoyl group, $G_{14}$ can also represent a 1-oxo-($C_2$–$C_{12}$)-alkylene group, a divalent radical of a dicarboxylic acid or of a dicarbamic acid, aliphatic, cycloaliphatic or aromatic, or also a —CO— group; or, when n is 1, $G_{13}$ and $G_{14}$ considered jointly, can also represent a divalent radical of a 1,2- or 1,3-dicarboxylic acid, aliphatic, cycloaliphatic or aromatic.

The $C_1$–$C_{12}$ alkyl or $C_1$–$C_{18}$ alkyl groups have already been described above under point (a').

The $C_5$–$C_7$ cycloalkyl groups are preferably cyclohexyl.

When $G_{13}$ represents a $C_7$–$C_8$ arylalkyl group, it is phenylethyl, preferably benzyl.

When $G_{13}$ represents a $C_2$–$C_5$ hydroxyalkyl group, it is 2-hydroxyethyl, 2-hydroxypropyl, etc.

Examples of $G_{13}$, when it represents a $C_2$–$C_{18}$ alkanoyl group, are: propionyl, butyryl, octanoyl, dodecanoyl, hexadecanoyl, octadecanoyl, etc. preferably acetyl and, when it represents a $C_3$–$C_5$ alkenoyl group, it is preferably acryloyl.

Examples of $G_{14}$, when it represents a $C_2$–$C_8$ alkenyl group, are: allyl, methallyl, 2-butenyl, 2-pentenyl, 2-hexenyl, 2-octenyl, etc.

Examples of $G_{14}$, when it represents a $C_1$–$C_4$ alkyl group substituted by a hydroxyl, cyano, alkoxycarbonyl or carbamide group, are: 2-hydroxyethyl, 2-hydroxypropyl, 2-cyanoethyl, methoxycarbonylmethyl, 2-ethoxycarbonylethyl, 2-aminocarbonylpropyl, 2-(dimethylaminocarbonyl)ethyl, etc.

Examples of $C_2$–$C_{12}$ alkylene groups, are: ethylene, propylene, 2,2-dimethylpropylene, tetramethylene, hexamethylene, octamethylene, decamethylene, dodecamethylene, etc.

Examples of $C_6$–$C_{15}$ arylene groups, are: o-, m- or p-phenylene, 1,4-naphthylene, 4,4'-diphenylene, etc.

An example of a $C_6$–$C_{12}$ cycloalkylene group is preferably cyclohexylene.

Preferred compounds having general formula (XXVI) are those wherein n is 1 or 2, G represents a hydrogen atom, $G_{11}$ represents a hydrogen atom or a methyl, $G_{13}$ represents a hydrogen atom, a $C_1$–$C_{12}$ alkyl group or a group having the formula:

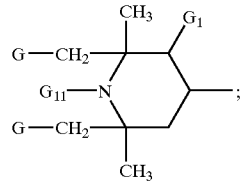

and $G_{14}$, when n is 1, represents a hydrogen atom or a $C_1$–$C_{12}$ alkyl group and, when n is 2, it represents a $C_2$–$C_8$ alkylene group or a 1-oxo-($C_2$–$C_8$)-alkylene group.

Specific examples of polyalkylpiperidines having general formula (XXVI) are:

1) N,N'-bis(2,2,6,6-tetramethylpiperidin-4-yl) hexamethylene-1,6-diamine;
2) N,N'-bis(2,2,6,6-tetramethylpiperidin-4-yl) hexamethylene-1,6-diacetamide;
3) bis(2,2,6,6-tetramethylpiperidin-4-yl)amine;
4) 4-benzoylamino-2,2,6,6-tetramethylpiperidine;
5) N,N'-bis(2,2,6,6-tetramethylpiperidin-4-yl)-N,N'-dibutyladipamide;
6) N,N'-bis(2,2,6,6-tetramethylpiperidin-4-yl)-N,N'-dicyclohexyl-2-hydroxypropylene-1,3-diamine;
7) N,N'-bis(2,2,6,6-tetramethylpiperidin-4-yl)-p-xylylenediamine;
8) N,N'-bis(2,2,6,6-tetramethylpiperidin-4-yl) succinamide;
9) bis(2,2,6,6-tetramethylpiperidin-4-yl)-N-(2,2,6,6-tetramethylpiperidin-4-yl)-β-aminodipropionate;

10) compound having the formula:

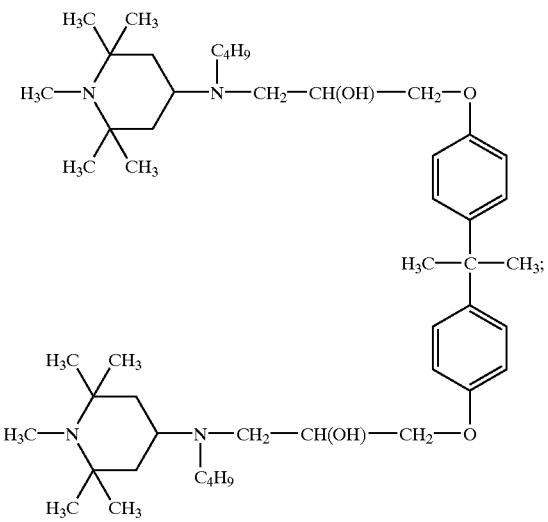

11) 4-[bis(2-hydroxyethyl)amino]-1,2,2,6,6-pentamethylpiperidine;
12) 4-(3-methyl-4-hydroxy-5-tert-butylbenzamido)-2,2,6,6-tetramethylpiperidine;
13) 4-methacrylamido-1,2,2,6,6-pentamethylpiperidine;

(c') Compounds having general formula (XXVII):

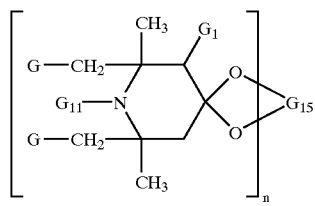

(XXVII)

wherein n is 1 or 2; G, $G_1$ and $G_{11}$ have the same meanings described above under point (a'); $G_{15}$, when n is 1, represents a $C_2$–$C_8$ alkylene or hydroxyalkylene group, or a $C_4$–$C_{22}$ acyloxyalkylene group, and, when n is 2, it is a (—$CH_2$)$_2$C($CH_2$—)$_2$ group.

Examples of $G_{15}$, when it represents a $C_2$–$C_8$ alkylene or hydroxyalkylene group, are: ethylene, 1-methylethylene, propylene, 2-ethylpropylene, 2-ethyl-2-hydroxymethylpropylene, etc.

An example of $G_{15}$, when it represents a $C_4$–$C_{22}$ acyloxyalkylene group is 2-ethyl-2-acetoxy-methylpropylene.

Specific examples of polyalkylpiperidines having general formula (XXVII) are:

1) 9-aza-8,8,10,10-tetramethyl-1,5-dioxaspiro[5.5]undecane;
2) 9-aza-8,8,10,10-tetramethyl-3-ethyl-1,5-dioxaspiro[5.5]undecane;
3) 8-aza-2,7,7,8,9,9-hexamethyl-1,4-dioxaspiro[4.5]decane;
4) 9-aza-3-hydroxymethyl-3-ethyl-8,8,9,10,10-pentamethyl-1,5-dioxaspiro-[5.5]undecane;
5) 9-aza-3-ethyl-3-acetoxymethyl-9-acetyl-8,8,10,10-tetramethyl-1,5-dioxaspiro[5.5]undecane;
6) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d') Compounds having general formula (XXVIIIA), (XXVIIIB) and (XXVIIIC), compounds having general formula (XXVIIIC) being preferred:

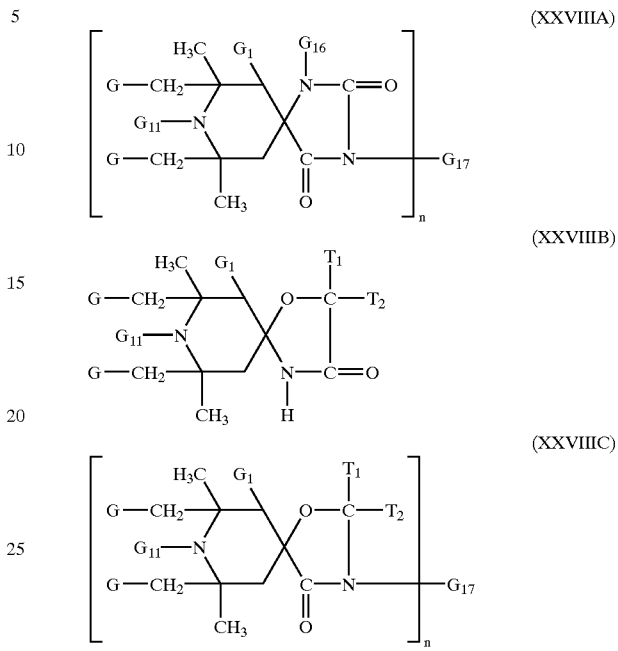

wherein n is 1 or 2, G, $G_1$ and $G_{11}$ have the same meanings defined above under point (a'); $G_{16}$ represents a hydrogen atom, a $C_1$–$C_{12}$ alkyl group, an allyl group, a benzyl, a glycidyl group or a $C_2$–$C_6$ alkoxyalkyl group; $G_{17}$, when n is 1, represents a hydrogen atom, a $C_1$–$C_{12}$ alkyl group, a $C_3$–$C_5$ alkenyl group, a $C_7$–$C_9$ arylalkyl group, a $C_5$–$C_7$ cycloalkyl group, a $C_2$–$C_4$ hydroxyalkyl group, a $C_2$–$C_6$ alkoxyalkyl group, a $C_6$–$C_{10}$ aryl group, a glycidyl group, or a group having the formula —(CH$_2$)$_p$—COO—Q or —(CH$_2$)$_p$—O—CO—Q wherein p is 1 or 2 and Q represents a $C_1$–$C_4$ alkyl group or a phenyl; $G_{17}$, when n is 2, represents a $C_2$–$C_{12}$ alkylene group, a $C_4$–$C_{12}$ alkenylene group, a $C_6$–$C_{12}$ arylene group, a group having the formula: —CH$_2$—CH(OH)—CH$_2$—O—D—O—CH$_2$—CH(OH)—CH$_2$— wherein D represents a $C_2$–$C_{10}$ alkylene group, a $C_6$–$C_{15}$ arylene group, a $C_6$–$C_{12}$ cycloalkylene group, or a group having the formula: —CH$_2$CH(OZ')CH$_2$—(OCH$_2$—CH(OZ')CH$_2$)$_2$ wherein Z' represents a hydrogen atom, a $C_1$–$C_{18}$ alkyl group, an allyl, a benzyl, or a $C_2$–$C_{12}$ alkanoyl group or a benzoyl; $T_1$ and $T_2$ each independently represent a hydrogen atom, a $C_1$–$C_{18}$ alkyl group, a $C_6$–$C_{10}$ aryl group, a $C_7$–$C_9$ arylalkyl group, said groups optionally substituted with a halogen atom or with a $C_1$–$C_4$ alkyl group; or $T_1$ and $T_2$, considered jointly with the carbon atom to which they are bound, form a $C_5$–$C_{14}$ cycloalkane ring.

Examples of $C_1$–$C_{12}$ alkyl groups are: methyl, ethyl, n-propyl, n-butyl, s-butyl, t-butyl, n-hexyl, n-octyl, 2-ethylhexyl, n-nonyl, n-decyl, n-undecyl, n-dodecyl, etc.

Examples of $C_1$–$C_{18}$ alkyl groups are, in addition to those listed above: n-tridecyl, n-tetradecyl, n-hexadecyl, n-octadecyl, etc.

Examples of $C_2$–$C_6$ alkoxyalkyl groups are: methoxymethyl, ethoxymethyl, propoxymethyl, t-butoxymethyl, ethoxyethyl, ethoxypropyl, n-butoxyethyl, t-butoxyethyl, isopropoxyethyl, propoxypropyl, etc.

Examples of $G_{17}$, when it represents a $C_3$–$C_5$ alkenyl group are: 1-propenyl, allyl, methallyl, 2-butenyl, 2-pentenyl, etc.

Examples of $G_{17}$, $T_1$ and $T_2$, when they represent a $C_7$–$C_9$ arylalkyl group are: phenethyl, preferably benzyl.

Examples of cycloalkane rings, formed by $T_1$ and $T_2$ when said substituents are considered jointly with the carbon atom to which they are bound, are: cyclopentane, cyclohexane, cyclooctane, cyclododecane, etc.

Examples of $G_{17}$, when it represents a $C_2$–$C_4$ hydroxyalkyl group, are: 2-hydroxyethyl, 2-hydroxypropyl, 2-hydroxybutyl, 4-hydroxybutyl, etc.

Examples of $G_{17}$, $T_1$ and $T_2$, when they represent a $C_6$–$C_{10}$ aryl group are: phenyl, α- or β-naphthyl, optionally substituted with a halogen atom or a $C_1$–$C_4$ alkyl group, etc.

Examples of $G_{17}$, when it represents a $C_2$–$C_{12}$ alkylene group, are: ethylene, propylene, 2,2-dimethylpropylene, tetramethylene, hexamethylene, octamethylene, decamethylene, dodecamethylene, etc.

Examples of $G_{17}$, when it represents a $C_4$–$C_{12}$ alkenylene group, are: 2-butenylene, 2-pentenylene, 3-hexenylene, etc.

Examples of $G_{17}$, when it represents a $C_6$–$C_{12}$ arylene group, are: o-, m- or p-phenylene, 1,4-naphthylene, 4,4'-diphenylene, etc.

Examples of Z', when it represents a $C_2$–$C_{12}$ alkanoyl group, are: propionyl, butyryl, octanoyl, dodecanoyl, preferably acetyl.

Examples of D, when it represents a $C_2$–$C_{10}$ alkylene group, a $C_6$–$C_{15}$ arylene group or $C_6$–$C_{12}$ cycloalkylene group, are described above relating to point (b').

Specific examples of polyalkylpiperidines having general formula (XXVIIIA), (XXVIIIB) and (XXVIIIC) are:

1) 3-benzyl-1,3,8-triaza-7,7,9,9-tetramethylspiro[4.5]-decane-2,4-dione;
2) 3-n-octyl-1,3,8-triaza-7,7,9,9-tetramethylspiro-[4.5]-decane-2,4-dione;
3) 3-allyl-1,3,8-triaza-1,7,7,9,9-pentamethylspiro-[4.5]-decane-2,4-dione;
4) 3-glycidyl-1,3,8-triaza-7,7,8,9,9-pentamethylspiro-[4.5]-decane-2,4-dione;
5) 1,3,7,7,8,9,9-heptamethyl-1,3,8-triazaspiro[4.5]-decane-2,4-dione;
6) 2-isopropyl-7,7,9,9-tetramethyl-1-oxa-3,8-diaza-4-oxospiro[4.5]decane;
7) 2,2-dibutyl-7,7,9,9-tetramethyl-1-oxa-3,8-diaza-4-oxospiro[4.5]decane;
8) 2,2,4,4-tetramethyl-7-oxa-3,20-diaza-21-oxodispiro-[5.1.11.2]heneicosane;
9) 2-butyl-7,7,9,9-tetramethyl-1-oxa-4,8-diaza-3-oxospiro[4.5]decane; and, preferably,
10) 8-acetyl-3-dodecyl-1,3,8-triaza-7,7,9,9-tetramethylspiro[4.5]-decane-2,4-dione;

or a compound having one of the following formulae:

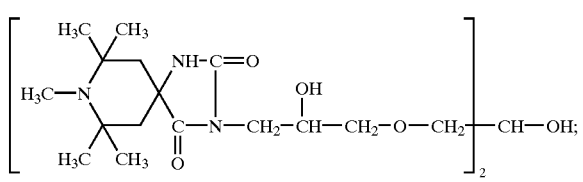

(XXVIII-11)

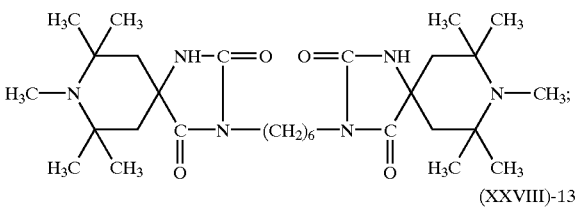

(XXVIII-12)

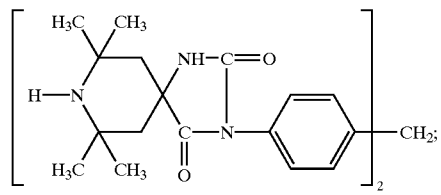

(XXVIII-13)

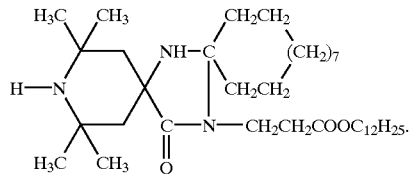

(XXVIII-14)

(e') Compounds having general formula (XXIX):

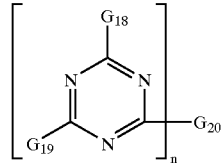

(XXIX)

wherein n is 1 or 2, and $G_{18}$ represents a group having one of the following formulae:

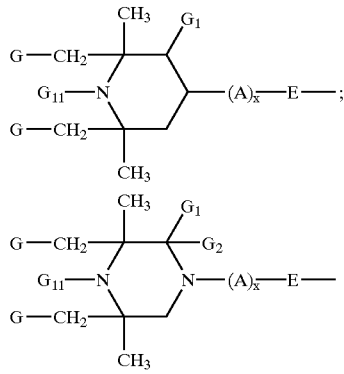

wherein G and $G_{11}$ have the same meanings defined above under point (a'); $G_1$ and $G_2$ represent a hydrogen atom, a methyl, or, considered jointly, they form a substituent =O, E represents —O— or —$NG_{13}$—; A represents a $C_2$–$C_6$ alkylene group or a —$(CH_2)_3$—O— group; x is 0 or 1; $G_{13}$ represents a hydrogen atom, a $C_1$–$C_{12}$ alkyl group, a $C_2$–$C_5$ hydroxyalkyl group, a $C_5$–$C_7$ cycloalkyl group; $G_{19}$ has the same meanings as $G_{18}$ or it represents one of the following groups: —$NG_{21}G_{22}$, —$OG_{23}$, —$NHCH_2OG_{23}$, or —$N(CH_2OG_{23})_2$; $G_{20}$, when n is 1, has the same meanings as $G_{18}$, or $G_{19}$, if n is 2, it represents an —E—B—E— group wherein B represents a $C_2$–$C_8$ alkylene group optionally interrupted by 1 or 2 —N($G_{21}$)— groups; $G_2$, represents a $C_1$–$C_{12}$ alkyl group, a cyclohexyl group, a benzyl, a $C_1$–$C_4$ hydroxyalkyl group, or a group having the following general formula:

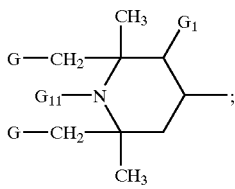

$G_{22}$ represents a $C_1$–$C_{12}$ alkyl group, a cyclohexyl group, a benzyl, a $C_1$–$C_4$ hydroxyalkyl group; $G_{23}$ represents a hydrogen atom, a $C_1$–$C_{12}$ alkyl group, a phenyl, or, $G_2$, and $G_{22}$, considered jointly, represent a $C_4$–$C_5$ alkylene or oxyalkylene group, for example:

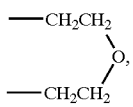

or a group having the formula:

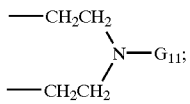

$G_{21}$ is a group having the general formula:

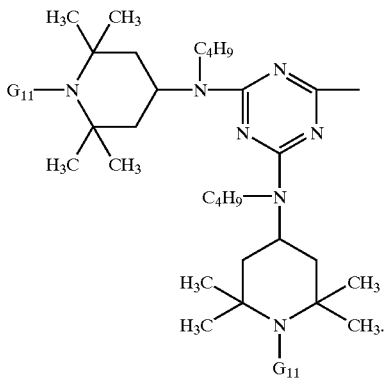

Examples of $C_1$–$C_{12}$ alkyl groups are: methyl, ethyl, n-propyl, n-butyl, s-butyl, t-butyl, n-hexyl, n-octyl, 2-ethylhexyl, n-nonyl, n-decyl, n-undecyl, n-dodecyl, etc.

Examples of $C_1$–$C_4$ hydroxyalkyl groups are: 2-hydroxyethyl, 2-hydroxypropyl, 3-hydroxypropyl, 2-hydroxybutyl, 4-hydroxybutyl, etc.

Examples of A, when it represents a $C_2$–$C_6$ alkylene group, are: ethylene, propylene, 2,2-dimethylpropylene, tetramethylene, hexamethylene, etc.

Examples of $G_{21}$ and $G_{22}$, when, considered jointly, they represent a $C_4$–$C_5$ alkylene or oxyalkylene group, are: tetramethylene, pentamethylene, 3-oxapentamethylene, etc.

Specific examples of polyalkylpiperidines having general formula (XXIX) are:

(XXIX)-1

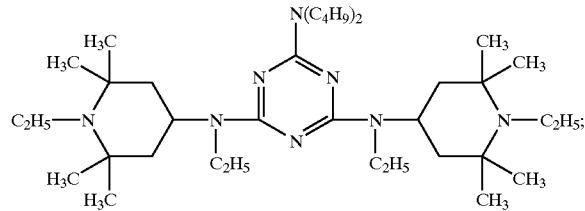

(XXIX)-2

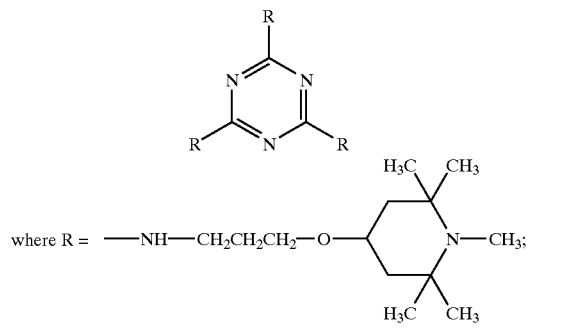

(XXIX)-3

(XXIX)-4
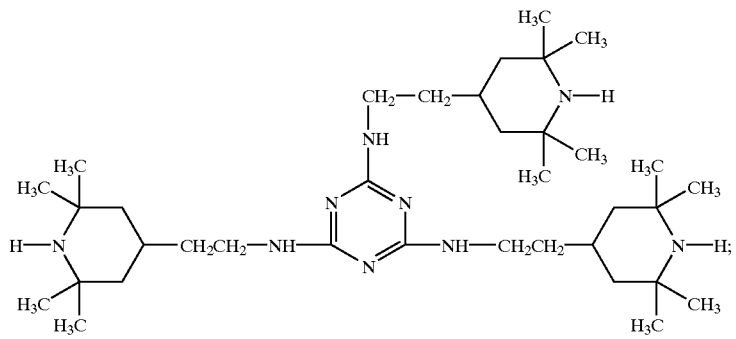
(XXIX)-5
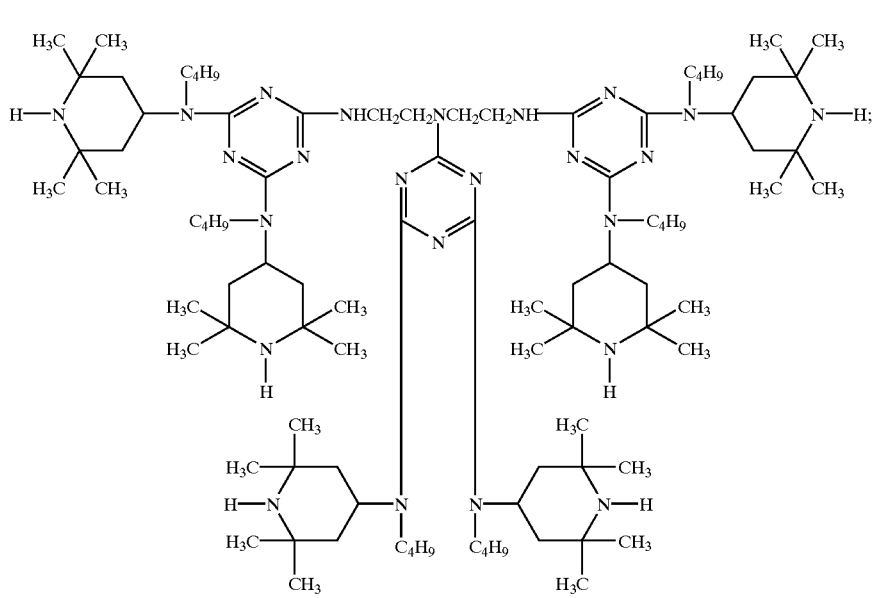
(XXIX)-6
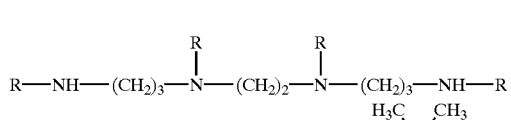
wherein R is
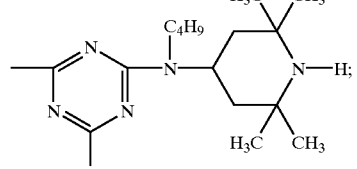

-continued
(XXIX)-7
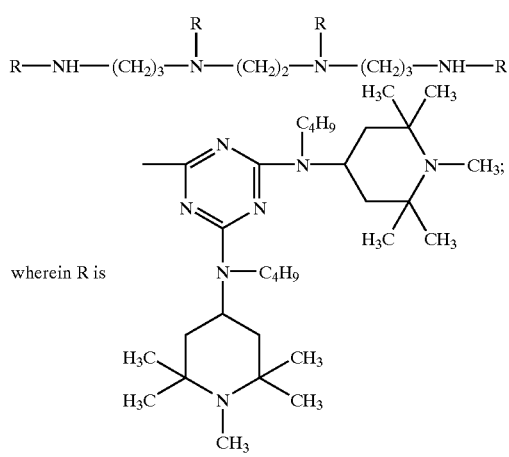
wherein R is
(XXIX)-8
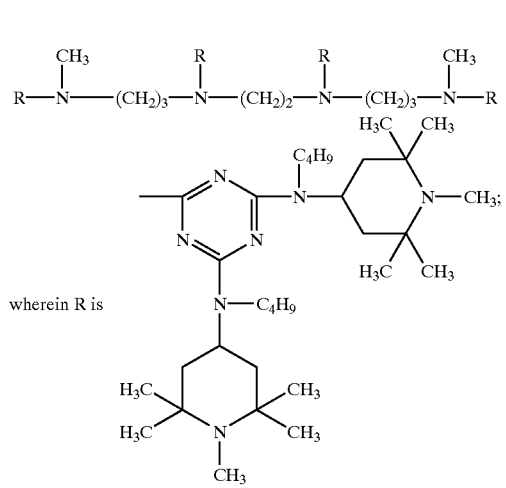
wherein R is
(XXIX)-9
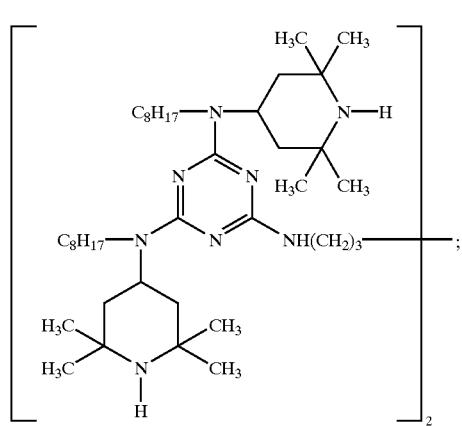

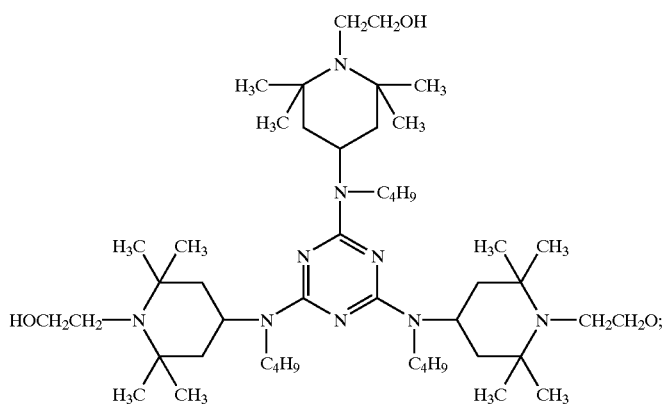

(XXIX)-10

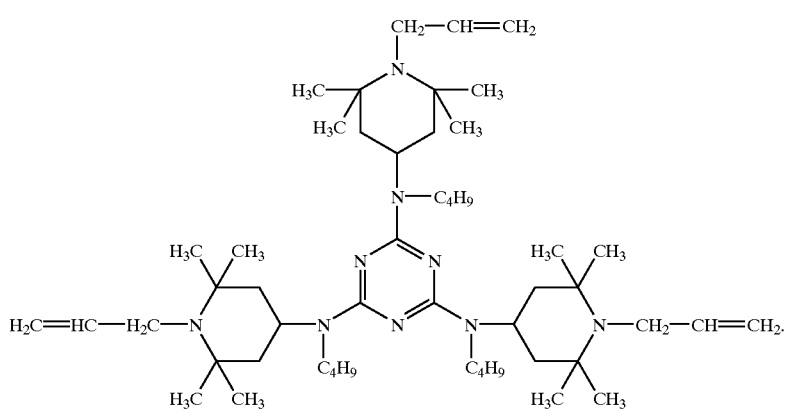

(XXIX)-11

(f') Oligomeric or polymeric compounds whose recurrent structural unit contains a 2,2,6,6-tetramethyl-piperidine radical, in particular polyesters, polyethers, polyamides, polyamines, polyurethanes, polyureas, polyaminotriazines, poly(meth)acrylates, poly(meth)acrylamides, and their copolymers containing said radical.

Specific examples of the above 2,2,6,6-polyalkylpiperidines are represented by the following formulae wherein m is a number ranging from 2 to 200:

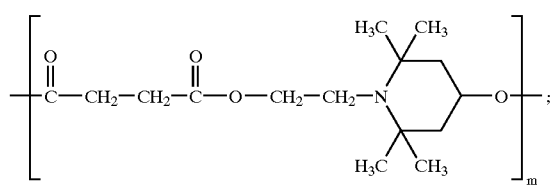

(XXX)-1

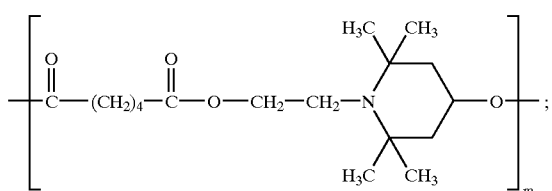

(XXX)-2

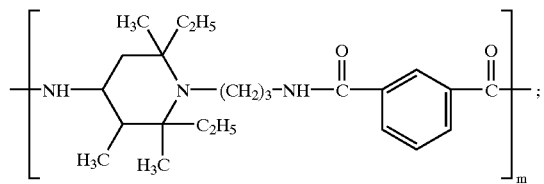

(XXX)-3

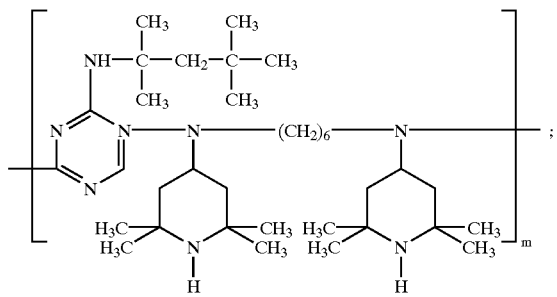

(XXX)-4

-continued
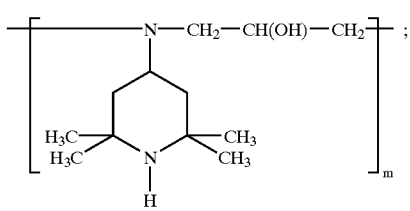
(XXX)-5
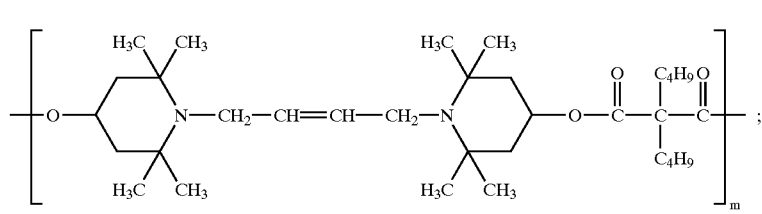
(XXX)-6
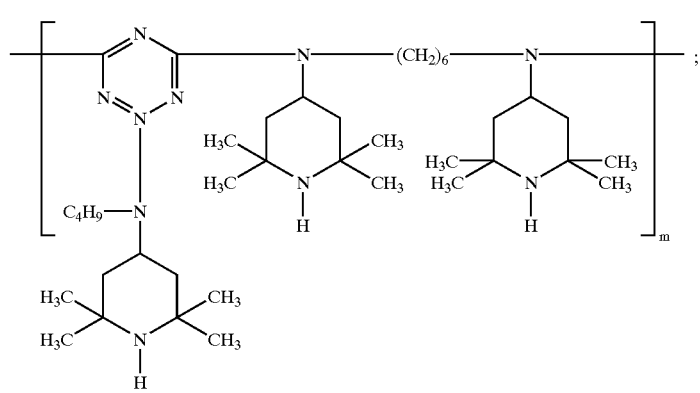
(XXX)-7
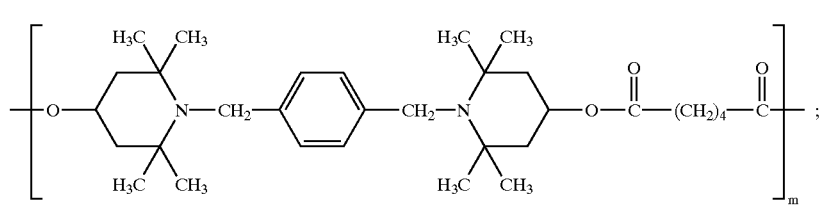
(XXX)-8
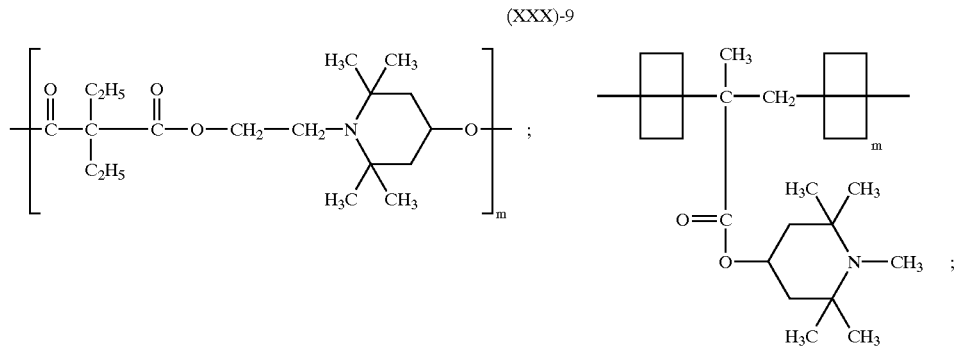
(XXX)-9
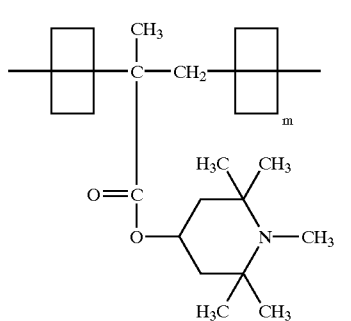
(XXX)-10

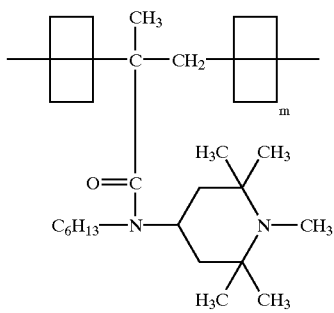
(XXX)-11

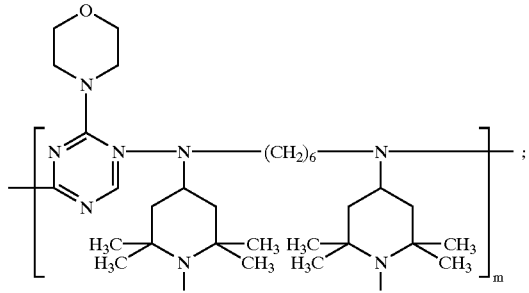
(XXX)-12

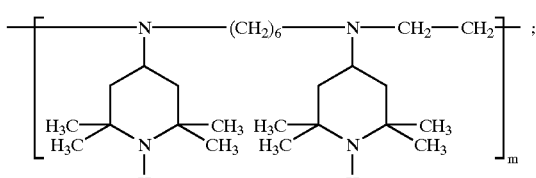
(XXX)-13

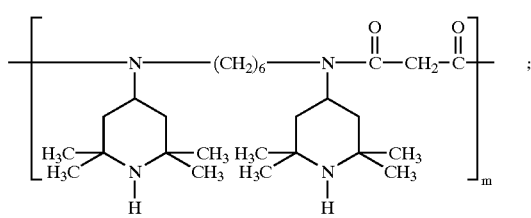
(XXX)-14

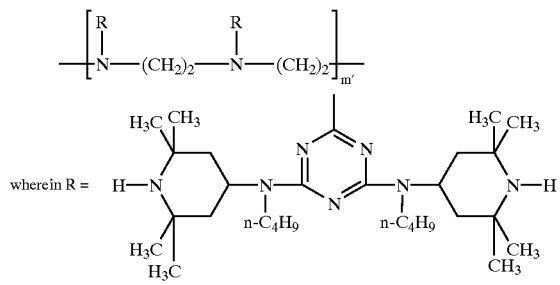

wherein m' and m" are an integer ranging from 0 to 200, extremes included, on the condition that m'+m" is m.

Further examples of polymeric compounds (f') useful for the purposes of the present invention are:

the reaction products between compounds having formula (XXXI):

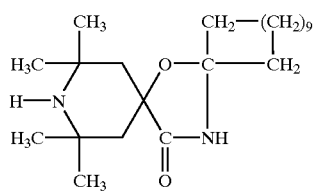
(XXXI)

and epichlorohydrin;

polyesters obtained from the reaction of butane-1,2,3,4-tetracarboxylic acid with a bifunctional alcohol having formula (XXXII):

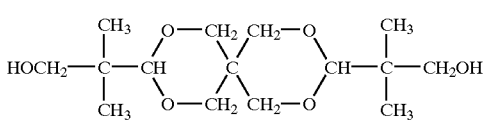
(XXXII)

whose carboxylic termination deriving from tetracarboxylic acid has been esterified with a 2,2,6,6-tetramethyl-4-hydroxypiperidine group;

compounds having general formula (XXXIII):

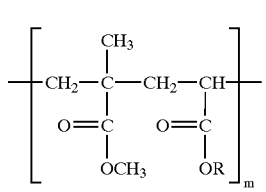
(XXXIII)

wherein about a third of the R radicals represents a —$C_2H_5$ group and the remainder a group having the formula:

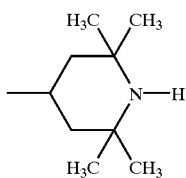

and m is a number ranging from 2 to 200, extremes included;

copolymers whose recurrent unit consists of two units having the formula:

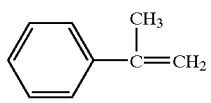

and, in each case, of a unit having the formula:

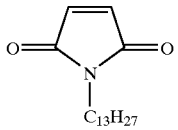

and a unit having the formula:

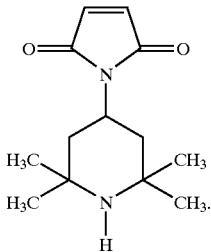

(g') Compounds having general formula (XXXIV):

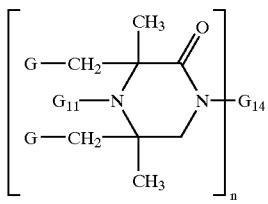

wherein n is 1 or 2, G and $G_{11}$ have the same meanings defined above under point (a') and $G_{14}$ has the same meanings described above under point (b'), on the condition that $G_{14}$ can never represent the group —CONH—Z or the group —CH$_2$—CH(OH)—CH$_2$—O—D—O.

Examples of compounds having general formula (XXXIV) are the following:

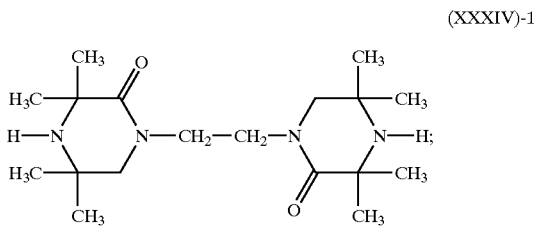
(XXXIV)-1

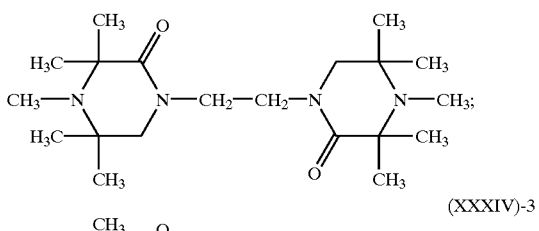
(XXXIV)-2

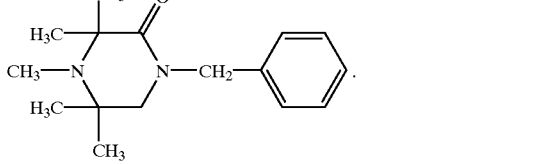
(XXXIV)-3

(h') Compounds having general formula (XXXV):

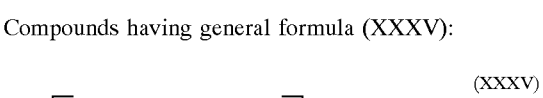

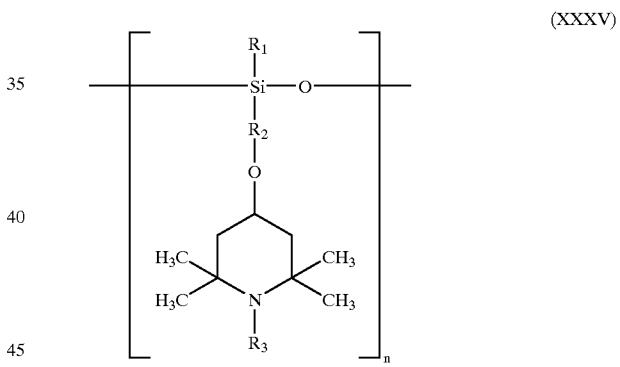
(XXXV)

wherein $R_1$ represents a $C_1$–$C_{10}$ alkyl group, a $C_5$–$C_{12}$ cycloalkyl group optionally substituted with a $C_1$–$C_4$ alkyl group, a phenyl optionally substituted with a $C_1$–$C_{10}$ alkyl group; $R_2$ represents a $C_3$–$C_{10}$ alkylene group; $R_3$ represents a hydrogen atom, a $C_1$–$C_8$ alkyl group, O, a —CH$_2$CN group, a $C_3$–$C_6$ alkenyl group, a $C_7$–$C_9$ phenylalkyl group optionally substituted in the phenyl radical with a $C_1$–$C_4$ alkyl group, a $C_1$–$C_8$ acyl group, an —OR'$_3$ group wherein R'$_3$ represents a $C_1$–$C_{10}$ alkyl group; and $n_1$ is a number ranging from 1 to 50, extremes included.

Of particular interest for the purposes of the present invention are compounds belonging to the group of sterically hindered amines (d), selected from: Tinuvin® 123 of Ciba Specialty Chemicals; Tinuvin® 144 of Ciba Specialty Chemicals; Lowilite® 76 of Great Lakes Chemical Corporation; Lowilite® 62 of Great Lakes Chemical Corporation; Lowilite® 94 of Great Lakes Chemical Corporation; Chimassorb® 119 of Ciba Specialty Chemicals; the compound having formula (XXXV)-1:

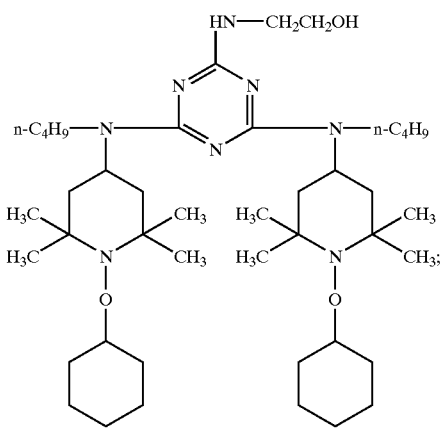

(XXXV-I)

poly-methylpropyl-3-oxy-[4-(2,2,6,6-tetramethyl) piperidinyl]siloxane, known under the trade-name of UVA-SIL® 299 OF Great Lakes Chemical Corporation; poly-methylpropyl-3-oxy-[4-(1,2,2,6,6-pentamethyl)piperidinyl] siloxane.

Compounds belonging to the group of sterically hindered amines (d) useful for the purposes of the present invention are those having an average molecular weight $M_n$ ranging from 500 to 10,000, in particular from 1,000 to 10,000.

The stabilizing mixtures, object of the present invention are capable of stabilizing organic polymers against degradation caused by oxygen, heat and/or light. Examples of organic polymers to which they can be added are:

1. Polymers of mono-olefins and di-olefins such as, for example, polypropylene, polyisobutylene, polybut-1-ene, poly-4-methylpent-1-ene, polyisoprene or polybutadiene; as well as polymers of cyclo-olefins such as, for example, cyclopentene or norbornene; polyethylene (which can be optionally cross-linked) such as, for example, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE), (VLDPE), (ULDPE).

Polyolefins such as, for example the mono-olefins mentioned in the above paragraph, preferably polyethylene and polypropylene, can be prepared with many methods known in literature, preferably using the following methods:

(a) radicalic polymerization (generally carried out at a high pressure and high temperature);

(b) catalytic polymerization using a catalyst which normally contains one or more metals of groups IVb, Vb, VIb or VIII of the Periodic Table. These metals generally have one or more ligands such as, for example, oxides, halides, alcoholates, esters, ethers, amines, alkyls, alkenyls and/or aryls which can be π- or σ-coordinated. These metal complexes can be in free form or supported on substrates such as, for example, activated magnesium chloride, titanium(III) chloride, alumina or silicon oxide. Said catalysts can be soluble or insoluble in the polymerization medium. The catalysts can be used alone or in the presence of other activators such as, for example, metal alkyls, metal hydrides, halides of metal alkyls, oxides of metal alkyls or metal alkyloxanes, these metals being elements belonging to groups Ia, IIa and/or IIIa of the Periodic Table. The activators can be conveniently modified with other ester, ether, amine or silyl-ether groups. These catalytic systems are usually called Phillips, Standard Oil Indiana, Ziegler(-Natta), TNZ (Du-Pont), metallocene or "single site catalyst" (SSC).

2. Mixtures of the polymers described under point (1) such as, for example, mixtures of polypropylene with polyisobutylene; mixtures of polypropylene with polyethylene (for example, PP/HDPE, PP/LDPE); mixtures of different types of polyethylene (for example, LDPE/HDPE).

3. Copolymers of mono-olefins and di-olefins with each other or with other vinyl monomers such as, for example, ethylene/propylene copolymers, linear low density polyethylene (LLDPE) and its mixtures with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as, for example, hexadiene, dicyclopentadiene or ethylidene-norbornene; and also mixtures of said copolymers with each other or with the polymers cited in under point (1) such as, for example, polypropylene/ethylene/propylene copolymers, LDPE/ethylene/vinylacetate (EVA) copolymers, LDPE/ethylene/acrylic acid (EAA) copolymers, LLDPE/EVA, LLDPE/EAA, and alternating or random polyalkylene/carbon monoxide copolymers and their mixtures with other polymers such as, for example, polyamides.

4. Hydrocarbon resins (for example, $C_5$–$C_9$) comprising their hydrogenated modifications (for example, adhesive resins) and mixtures with polyalkylene and starch.

5. Polystyrene, poly(p-methylstyrene), poly(α-methylstyrene).

6. Copolymers of styrene or α-methylstyrene with dienes or acrylic derivatives such as, for example, styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures, having a high impact strength, between copolymers of styrene and another polymer such as, for example, a polyacrylate, a polymer of a diene or an ethylene/propylene/diene terpolymer, block copolymers of styrene such as, for example, styrene/butadiene/styrene, styrene/isoprene/styrene, styrene/ethylene/butylene/styrene or styrene/ethylene/propylene/styrene.

7. Grafted copolymers of styrene or of α-methylstyrene such as, for example, styrene in polybutadiene, styrene in polybutadiene/styrene or polybutadiene-acrylonitrile copolymers; styrene and acrylonitrile (or methacrylonitrile) in polybutadiene; styrene, acrylonitrile and methylmethacrylate in polybutadiene; styrene and maleic anhydride in polybutadiene; styrene, acrylonitrile and maleic anhydride or maleimide in polybutadiene; styrene and maleimide in polybutadiene; styrene and alkylacrylates or alkylmethacrylates in polybutadiene; styrene and acrylonitrile in ethylene/propylene/diene terpolymers, styrene and acrylonitrile in polyalkyl acrylates or polyalkyl methacrylates, styrene and acrylonitrile in acrylate/butadiene copolymers, as well as mixtures of the copolymers listed above with the copolymers cited under point (6) such as, for example, mixtures of known copolymers such as ABS, MBS, ASA or AES.
8. Polymers containing halogens such as, for example, polychloroprene, chlorinated rubbers, chlorinated or brominated isobutylene-isoprene copolymers ("halobutyl rubber"), chlorinated or chlorosulfonated polyethylene, ethylene and chlorinated ethylene copolymers, homopolymers and copolymers of epichlorohydrin, in particular polymers of vinyl compounds containing halogens such as, for example, polyvinyl chloride, polyvinylidene chloride, polyvinyl fluoride or polyvinylidene fluoride; and also their copolymers such as, for example, vinyl chloride/vinylidene chloride, vinyl chloride/vinyl acetate or vinylidene chloride/vinyl acetate.
9. Polymers deriving from $\alpha,\beta$-unsaturated acids and their derivatives such as, for example, polyacrylates and polymethacrylates, polymethyl methacrylates, polyacrylamides and polyacrylonitriles, impact modified with butyl acrylate.
10. Copolymers of monomers according to point (9) with each other or with other unsaturated monomers such as, for example, acrylonitrile/butadiene copolymers, acrylonitrile/alkyl acrylate copolymers, acrylonitrile/alkoxyalkyl acrylate copolymers or acrylonitrile/vinyl halide copolymers or acrylonitrile/alkyl methacrylate/butadiene terpolymers.
11. Polymers deriving from unsaturated alcohols and amines, or their acyl or acetal derivatives such as, for example, polyvinyl alcohol, polyvinyl acetate, polyvinyl stearate, polyvinyl benzoate, polyvinyl maleate, polyvinyl butyral, polyallyl phthalate or polyallyl melamine; and also their copolymers with the olefins listed under point (1).
12. Homopolymers and copolymers of open-chain ethers or cyclic ethers such as, for example, polyalkylene glycols, polyethylene oxide, polypropylene oxide, or copolymers of the compounds described above with bis-glycidyl ethers.
13. Polyacetals such as, for example, polyoxymethylene and those polyoxymethylenes containing comonomers, for example, ethylene oxide; polyacetals modified with thermoplastic polyurethanes, acrylates or MBS.
14. Polyphenylene oxides and sulfides and their mixtures with styrene polymers or polyamides.
15. Polyurethanes deriving from hydroxyl-terminated polyethers, polyesters or polybutadienes on the one hand and aliphatic or aromatic polyisocyanates on the other, as well as their precursors.
16. Polyamides and copolyamides deriving from diamines and dicarboxylic acids and/or aminocarboxylic acids or from the corresponding lactams such as, for example, polyamide 4, polyamide 6, polyamide 6/6, 6/10, 6/9, 6/12, 4/6, 12/12, polyamide 11, polyamide 12, aromatic polyamides obtained starting from m-xylene diamine and adipic acid; polyamides prepared from hexamethylenediamine and isophthalic and/or terephthalic acid and with or without an elastomer as modifier, for example, poly-2,4,4-trimethylhexamethylene terephthalamide or poly-m-phenylene isophthalamide; and also block copolymers of the above polyamides with polyolefins, olefinic copolymers, ionomers or elastomers chemically bound or grafted; or with polyethers such as, for example, polyethylene glycol, polypropylene glycol or polytetramethylene glycol; as well as polyamides or copolyamides modified with EPDM or ABS; and polyamides condensed during processing ("RIM polyamide system").
17. Polyureas, polyimides, polyamide-imides, polyetherimides, polyesterimides, polyhydantoins, and polybenzoimidazoles.
18. Polyesters deriving from dicarboxylic acids and diols and/or from hydroxycarboxylic acids or from the corresponding lactones such as, for example, polyethylene terephthalate, polybutylene terephthalate, poly-1,4-dimethylolcyclohexane terephthalate and polyhydroxybenzoates, as well as block copolyether esters deriving from polyethers with hydroxyl-terminated groups; and also polyesters modified with polycarbonates or MBS.
19. Polycarbonates and polyester carbonates.
20. Polysulfones, polyethersulfones and polyetherketones.
21. Cross-linked polymers deriving from aldehydes on the one hand and from phenols, urea and melamines on the other, such as, for example, phenol/formaldehyde resins, urea/formaldehyde resins and melamine/formaldehyde resins.
22. Dried or non-dried alkyd resins.
23. Resins based on unsaturated polyesters deriving from copolyesters of dicarboxylic acids saturated and unsaturated with polyhydric alcohols and vinyl compounds as cross-linking agents, and also the above resins containing halogens and having a good flame-resistance.
24. Cross-linkable acrylic resins deriving from substituted acrylates such as, for example, epoxy acrylates, urethane acrylates or polyester acrylates.
25. Alkyd resins, resins based on polyesters or acrylated resins cross-linked with melamine resins, resins based on urea, resins based on isocyanates, resins based on isocyanurates, resins based on polyisocyanates or epoxy resins.
26. Cross-linked epoxy resins deriving from aliphatic, cycloaliphatic, heterocyclic or aromatic glycidyl compounds such as, for example, products of diglycidyl ethers of bisphenol A and bisphenol F, which are cross-linked with the usual cross-linking agents such as, for example, anhydrides or amines, in the presence of or without accelerating agents.
27. Natural polymers such as, for example, cellulose, rubber, gelatin, and their derivatives chemically modified to give homologous polymers such as, for example, cellulose acetates, propionates and butyrates, or cellulose ethers such as, for example, methyl-cellulose; as well as hydrocarbon resins ("rosins") and their derivatives.
28. Mixtures of the above polymers ("polyblends") such as, for example, PP/EPDM, polyamides/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylates, POM/MBS, PPO/HIPS, PPO/PA 6.6 and copolymers, PA/HDPE, PA/PP, PA/PPO, PBT/PC/ABS, PBT/PET/PC.
29. Natural or synthetic organic materials which are pure monomeric compounds or mixtures of said compounds, such as, for example, mineral oils, animal or vegetable oils, fats or waxes, oils, fats or waxes based on synthetic esters (for example, phthalates, adipates, phosphates, trimellitates), as well as mixtures of synthetic esters with mineral oils in any weight ratio, in particular those used in spinning compositions, as well as aqueous emulsions of said organic materials.
30. Aqueous emulsions of natural or synthetic rubbers such as, for example, natural latex or latexes based on carboxylated styrene-butadiene copolymers.

The stabilizing mixtures, object of the present invention can also be used in the production of polyurethanes, particularly in the production of polyurethane foams. In this way, the polyurethanes and polyurethane foams thus obtained are protected against degradation caused by oxygen, heat and/or light; in particular scorching is avoided during the production of said foams.

The polyurethanes can be obtained, for example, by the reaction of polyethers, polyesters and polybutadienes containing chain-end hydroxyl groups with aliphatic or aromatic polyisocyanates.

Polyethers having chain-end hydroxyl groups are generally known and can be prepared, for example, by the polymerization of epoxides such as, for example, ethylene oxide, propylene oxide, butylene oxide, tetrahydrofuran, styrene oxide, or epichlorohydrin, for example in the presence of boron trifluoride, or by the addition reaction of said epoxides, alone or mixed with each other or in succession, with starting compounds containing reactive hydrogen atoms such as water, alcohols, ammonia or amines such as, for example, ethylene glycol, propylene 1,2- or 1,3-glycol, trimethylolpropane, 4,4'-dihydroxydiphenylpropane, aniline, ethanolamine or ethylenediamine. Polyethers containing sucrose can also be used for the purpose. In most cases, polyethers containing a large number of primary OH groups (up to 90% by weight based on the total number of OH groups present in the polyether), are preferred. In addition, polyethers modified with vinyl polymers can be used, which are prepared, for example, by the polymerization of styrene and acrylonitrile in the presence of polyethers, which are polybutadienes containing OH groups.

The above compounds have a molecular weight ranging from 400 to 10,000 and are polyhydroxyl compounds, in particular, compounds containing from 2 to 8 hydroxyl groups, in particular those having a molecular weight ranging from 800 to 10,000, preferably from 1,000 to 6,000, for example, polyethers containing at least 2, generally from 2 to 8, but preferably from 2 to 4, hydroxyl groups, which are known for the preparation of homogeneous polyurethanes and cellular polyurethanes.

It is obviously possible to use mixtures of the above compounds containing at least two isocyanate-reactive hydrogen atoms, in particular having a molecular weight ranging from 400 to 10,000.

Polyisocyanates useful for the purpose are aliphatic, cycloaliphatic, araliphatic, aromatic and heterocyclic polyisocyanates such as, for example, ethylene diisocyanate, 1,4-tetramethylene diisocyanate, 1,6-hexamethylene diisocyanate, 1,12-dodecane diisocyanate, cyclobutane, 1,3-diisocyanate, cyclohexane, 1,3- and 1,4-diisocyanate, and also any mixture of said isomers; 1-isocyanate-3,3,5-trimethyl-5-isocyanatemethylcyclohexane, 2,4- and 2,6-hexahydrotolylene diisocyanate, and also any mixture of these isomers; hexahydro-1,3 and/or -1,4-phenylene diisocyanate, perhydro-2,4'- and/or -4,4'-diphenylmethanediisocyanate, 1,3- and 1,4-phenylene diisocyanate, 2,4 and 2,6-tolylene diisocyanate, and any mixture of these isomers; diphenylmethane 2,4' and/or 4,4'-diisocyanate, naphthylene 1,5-diisocyanate, triphenylmethane 4,4',4''-triisocyanate, polyphenyl-polymethylene polyisocyanates obtained by aniline-formaldehyde condensation followed by phosgenation, m- and p-isocyanatephenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated ureic groups, polyisocyanates containing biuret groups, polyisocyanates containing ester groups, reaction products of the above isocyanates with acetals, polyisocyanates containing radicals of polymeric fatty acids.

It is also possible to use distillation residues containing isocyanate groups which are present as such or are dissolved in one or more of the above polyisocyanates, and are obtained during the industrial preparation of isocyanates. It is also possible to use any mixture of the above polyisocyanates.

Polyisocyanates which can be easily obtained industrially, are preferably used, such as, for example, 2,4- and 2,6-tolylene diisocyanate and any mixture of said isomers ("TDI"); polyphenyl-polymethylene-polyisocyanates prepared by aniline-formaldehyde condensation followed by phosgenation ("crude MDI"); polyisocyanates containing carboimide, urethane, allophanate, isocyanurate, ureic, biuret (modified polyurethanes) groups.

The organic polymers which can be stabilized with the mixtures, object of the present invention, are, preferably, natural, semi-synthetic or synthetic polymers selected from those described above. More preferably, the mixtures, object of the present invention, are useful in the stabilization of thermoplastic polymers, especially polyolefins, in particular polyethylene and polypropylene or their copolymers with mono- and di-olefins.

A further object of the present invention therefore relates to polymeric compositions containing an organic polymer and an effective quantity of one of the stabilizing mixtures, object of the present invention. Yet another object of the present invention relates to the end-products obtained from the processing of the above polymeric compositions.

The stabilizing mixtures, object of the present invention, are particularly useful against degradation caused by oxygen and heat and are consequently exceptionally useful as process stabilizers.

Compounds (a), (b) and (c) and, optionally, (d) of the above stabilizing mixtures can be added to the organic polymers to be stabilized either individually or mixed with each other.

Compound (a) is added to the organic polymers to be stabilized in a quantity ranging from 0.0005% to 5% with respect to the weight of the organic polymer to be stabilized, preferably from 0.001% to 2%, for example, from 0.01% to 2%.

Compounds (b), (c) and, optionally, (d), are added to the organic polymers to be stabilized in a quantity ranging from 0.01% to 10% with respect to the weight of the organic polymer to be stabilized, for example from 0.01% to 5%, preferably from 0.025% to 3%, even more preferably from 0.025% to 1%.

The stabilizing mixtures object of the present invention can optionally contain other stabilizers (costabilizers).

Stabilizers for organic polymers useful for the purpose are selected from the following groups:

1. Antioxidants 1.1 Alkylated monophenols such as, for example: 2,6-di-t-butyl-4-methylphenol; 2-t-butyl-4,6-dimethylphenol; 2,6-di-t-butyl-4-ethylphenol; 2,6-di-t-butyl-4-n-butylphenol; 2,6-di-t-butyl-4-isobutylphenol; 2,6-dicyclopentyl-4-methylphenol; 2-(α-methylcyclohexyl)-4,6-dimethylphenol; 2,6-dioctadecyl-4-methylphenol; 2,4,6-tricyclohexylphenol; 2,6-di-t-butyl-4-methoxymethylphenol; nonylphenols with a linear or branched alkyl chain such as, for example, 2,6-di-nonyl-4-methylphenol; 2,4-dimethyl-6-(1'-methylundec-1'-yl) phenol; 2,4-dimethyl-6-(1'-methylheptadec-1'-yl)phenol; 2,4-dimethyl-6-(1'-methyltridec-1'-yl)phenol; and their mixtures.

1.2 Alkylthiomethylphenols such as, for example: 2,4-dioctylthiomethyl-6-t-butylphenol; 2,4-dioctylthiomethyl-6-methylphenol; 2,4-dioctylthiomethyl-6-ethylphenol; 2,6-didodecylthiomethyl-4-nonylphenol.

1.3 Hydroquinones and alkylated hydroquinones such as, for example: 2,6-di-t-butyl-4-methoxyphenol; 2,5-di-t-butylhydroquinone; 2,5-di-t-amylhydroquinone; 2,6-diphenyl-4-octadecyloxyphenol; 2,6-di-t-butylhydroquinone; 2,5-di-t-butyl-4-hydroxyanisol; 3,5-di-t-butyl-4-hydroxyanisol; 3,5-di-t-butyl-4-hydroxyphenyl stearate; bis(3,5-di-t-butyl-4-hydroxyphenyl)adipate.

1.4 Tocopherols such as, for example: α-tocopherol, β-tocopherol, γ-tocopherol, δ-tocopherol and their mixtures (Vitamin E).

1.5 Hydroxylated thiodiphenyl ethers such as, for example 2,2'-thiobis-(6-t-butyl-4-methylphenol); 2,2'-thiobis-(4-octylphenol); 4,4'-thiobis-(6-t-butyl-3-methylphenol); 4,4'-thiobis-(6-t-butyl-2-methylphenol); 4,4'-thiobis-(3,6-di-s-amylphenol); 4,4'-bis-(2,6-dimethyl-4-hydroxyphenyl)disulfide.

1.6 Alkylidene-bisphenols such as, for example: 2,2'-methylenebis-(6-t-butyl-4-methylphenol); 2,2'-methylenebis-(6-t-butyl-4-ethylphenol); 2,2'-methylenebis[4-methyl-6-(α-methylcyclohexyl)phenol]; 2,2'-methylene-bis(4-methyl-6-cyclohexylphenol); 2,2'-methylenebis(6-nonyl-4-methylphenol); 2,2'-methylenebis(4,6-di-t-butylphenol); 2,2'-ethylidenebis(4,6-di-t-butylphenol); 2,2'-ethylidenebis(6-t-butyl-4-isobutylphenol); 2,2'-methylenebis[6-(α-methylbenzyl)-4-nonylphenol]; 2,2'-methylenebis[6-(α,α-dimethylbenzyl)-4-nonylphenol]; 4,4'-methylenebis (2,6-di-t-butylphenol); 4,4'-methylenebis(6-t-butyl-2-methylphenol); 1,1-bis(5-t-butyl-4-hydroxy-2-methylphenyl)butane; 2,6-bis(3-t-butyl-5-methyl-2-hydroxybenzyl)-4-methylphenol; 1,1,3-tris-(5-t-butyl-4-hydroxy-2-methylphenyl)butane; 1,1-bis(5-t-butyl-4-hydroxy-2-methylphenyl)-3-n-dodecylmercaptobutane; ethyleneglycol bis[3,3-bis-(3'-t-butyl-4'-hydroxyphenyl) butyrate]; bis-(3-t-butyl-4-hydroxy-5-methylphenyl) dicyclopentadiene; bis[2-(3'-t-butyl-2'-hydroxy-5'-methylbenzyl)-6-t-butyl-4-methylphenyl]terephthalate; 1,1-bis(3,5-dimethyl-2-hydroxyphenyl)butane; 2,2-bis(3,5-di-t-butyl-4-hydroxy-phenyl)propane; 2,2-bis(5-t-butyl-4-hydroxy-2-methylphenyl)-4-n-dodecylmercaptobutane; 1,1,5,5-tetra(5-t-butyl-4-hydroxy-2-methylphenyl)pentane.

1.7 Benzyl compounds containing O, N or S such as, for example: 3,5,3',5'-tetra-t-butyl-4,4'-dihydroxydibenzylether; octadecyl-4-hydroxy-3,5-dimethylbenzylmercaptoacetate; tridecyl-4-hydroxy-3,5-di-t-butyl-benzylmercaptoacetate; tris(3,5-di-t-butyl-4-hydroxybenzyl)amine; bis(4-t-butyl-3-hydroxy-2,6-dimethylbenzyl)dithioterephthalate; bis(3,5-di-t-butyl-4-hydroxybenzyl)sulfide; isooctyl-3,5-di-t-butyl-4-hydroxybenzylmercaptoacetate.

1.8 Hydroxybenzylated malonates such as, for example: dioctadecyl-2,2-bis(3,5-di-t-butyl-2-hydroxybenzyl) malonate; dioctadecyl-2-(3-t-butyl-4-hydroxy-5-methylbenzyl)malonate; didodecylmercaptoethyl-2,2-bis (3,5-di-t-butyl-4-hydroxybenzyl)malonate; bis[4-(1,1,3,3-tetramethylbutyl)phenyl]-2,2-bis(3,5-di-t-butyl-4-hydroxybenzyl)malonate.

1.9 Aromatic hydroxybenzyl compounds such as, for example: 1,3,5-tris(3,5-di-t-butyl-4-hydroxybenzyl)-2,4,6-trimethylbenzene; 1,4-bis-(3,5-di-t-butylhydroxybenzyl)-2,3,5,6-tetramethylbenzene; 2,4,6-tris(3,5-di-t-butyl-4-hydroxybenzyl)phenol.

1.10 Triazine compounds such as, for example: 2,4-bis (octylmercapto)-6-(3, 5-di-t-butyl-4-hydroxyaniline)-1,3, 5-triazine; 2-octylmercapto-4,6-bis(3,5-di-t-butyl-4-hydroxyaniline)-1,3,5-triazine; 2-octylmercapto-4,6-bis-(3,5-di-t-butyl-4-hydroxyphenoxy)-1,3,5-triazine; 2,4,6-tris-(3,5-di-t-butyl-4-hydroxyphenoxy)-1,2,3-triazine; 1,3,5-tris(3,5-di-t-butyl-4-hydroxybenzyl)isocyanurate; 1,3,5-tris(4-t-butyl-3-hydroxy-2, 6-dimethylbenzyl) isocyanurate; 2,4,6-tris-(3,5-di-t-butyl-4-ydroxyphenylethyl)-1,3,5-triazine; 1,3,5-tris(3,5-di-t-butyl-4-hydroxyphenylpropionyl)hexahydro-1,3,5-triazine; 1,3,5-tris(3,5-dicyclohexyl-4-hydroxybenzyl) isocyanurate.

1.11 Benzylphosphonates such as, for example: dimethyl-2,5-di-t-butyl-4-hydroxybenzylphosphonate; diethyl-3,5-di-t-butyl-4-hydroxybenzylphosphonate; dioctadecyl-3,5-di-t-butyl-4-hydroxybenzylphosphonate; dioctadecyl-5-t-butyl-4-hydroxy-3-methylbenzylphosphonate; calcium salts of monoethyl ester of 3,5-di-t-butyl-4-hydroxybenzylphosphonic acid.

1.12 Acylaminophenols such as, for example: 4-hydroxylauranilide; 4-hydroxystearanilide; octyl-N-(3, 5-di-t-butyl-4-hydroxyphenyl)carbamate.

1.13 Esters of β-(3,5-di-t-butyl-4-hydroxyphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxalamide, 3-thioundecanol, 3-thiopentadecanol, trimethylhexanediol, trimethylolpropane, 4-hydroxymethyl-1-phospho-2,6,7-trioxabicyclo-[2.2.2]-octane.

1.14 Esters of β-(5-t-butyl-4-hydroxy-3-methylphenyl) propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thioundecanol, 3-thiopentadecanol, trimethylhexanediol, trimethylolpropane, 4-hydroxymethyl-1-phospho-2,6,7-trioxabicyclo[2.2.2]octane.

1.15 Esters of β-(3,5-dicyclohexyl-4-hydroxyphenyl) propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thioundecanol, 3-thiopentadecanol, trimethylhexanediol, trimethylolpropane, 4-hydroxymethyl-1-phospho-2,6,7-trioxabicyclo[2.2.2]-octane.

1.16 Esters of (3,5-di-t-butyl-4-hydroxyphenyl)acetic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thioundecanol, 3-thiopentadecanol, trimethylhexanediol, trimethylolpropane, 4-hydroxymethyl-1-phospho-2,6,7-trioxabicyclo[2.2.2]octane.

1.17 Amides of β-(3,5-di-t-butyl-4-hydroxyphenyl) propionic acid such as, for example: N,N'-bis(3,5-di-t-butyl-4-hydroxyphenylpropionyl) hexamethylenediamide; N,N'-bis(3,5-di-t-butyl-4-hydroxyphenylpropionyl)trimethylenediamide; N,N'-bis(3,5-di-t-butyl-4-hydroxyphenylpropionyl)hydrazide; N,N'-bis[2-(3-[3,5-di-t-butyl-4-hydroxyphenyl]propionyloxy)ethyl]oxamide (Naugard® XL-1 of Uniroyal).

1.18 Ascorbic acid (vitamin C).

1.19 Aminic antioxidants such as, for example, N,N'-diisopropyl-p-phenylenediamine; N,N'-di-s-butyl-p-phenylenediamine; N,N'-bis(1,4-dimethylpentyl)-p-phenylenediamine; N,N'-bis(l-ethyl-3-methylpentyl)-p-phenylenediamine; N,N'-bis(1-methylheptyl)-p-phenylenediamine; N,N'-dicyclohexyl-p-phenylenediamine; N,N'-diphenyl-p-phenylenediamine; N,N'-bis(2-naphthyl)-p-phenylenediamine; N-isopropyl-N'-phenyl-p-phenylenediamine; N-(1,3-dimethylbutyl)-N'-phenyl-p-phenylenediamine; N-(1-methylheptyl)-N'-phenyl-p-phenylenediamine; N-cyclohexyl-N'-phenyl-p-phenylenediamine; 4-(p-toluenesulfamoyl) diphenylamine; N,N'-dimethyl-N,N'-di-s-butyl-p-phenylenediamine; diphenylamine; N-allyldiphenylamine; 4-isopropoxydiphenylamine; N-phenyl-1-naphthylamine; N-(4-t-octylphenyl)1-naphthylamine; N-phenyl-2-naphthylamine; diphenylamine octylate such as, for example, p,p'-di-t-octyldiphenylamine; 4-n-butylaminophenol; 4-butirylaminophenol; 4-nonanoylaminophenol; 4-dodecanoylaminophenol; 4-octadecanoylaminophenol; bis(4-methoxyphenyl)amine; 2,6-di-t-butyl-4-dimethylaminomethylphenol; 2,4'-diaminodiphenylmethane; 4,4'-diaminodiphenylmethane; N,N,N',N'-tetramethyl-4,4'-diaminodiphenylmethane; 1,2-bis[(2-meth-ylphenyl)amino]ethane; 1,2-bis(phenylamino) propane; (o-tolyl)biguanide; bis[4-(1',3'-dimethylbutyl) phenyl]amine; N-phenyl-1-naphthylamine t-octylate; mixture of mono- and dialkylated t-butyl/t-octyldiphenylamines; mixture of mono- and dialkylated nonyldiphenylamines; mixture of mono- and dialkylated dodecyldiphenylamines; mixture of mono- and dialkylated isopropyl/isohexyldiphenylamines; mixture of mono- and dialkylated t-butyldiphenylamines; 2,3-dihydro-3,3-dimethyl-4H-1,4-benzothiazine; phenothiazine; mixture of mono- and dialkylated t-butyl/t-octylphenothiazines; mixture of mono- and dialkylated t-octyl-phenothiazines; N-allyl-phenothiazine; N,N,N',N'-tetraphenyl-1,4-diaminobut -2-ene; N,N-bis(2,2,6,6-tetramethylpiperid-4-yl)hexame-thylenediamine; bis-(2,2,6,6-tetramethylpiperid-4-yl)se-bacate; 2,2,6,6-tetramethylpiperidin-4-one; 2,2,6,6-tetramethylpiperidin-4-ol.

2. UV ray and light stabilizers.

2.1 Derivatives of 2-(2'-hydroxyphenyl)benzotriazoles such as, for example: 2-(2'-hydroxy-5'methylphenyl) benzotriazole; 2-(3',5'-di-t-butyl-2'-hydroxyphenyl) benzotriazole; 2-(5'-t-butyl-2'-hydroxyphenyl) benzotriazole; 2-[2'-hydroxy-5'-(1,1,3,3-tetramethylbutyl)phenyl]benzotriazole; 2-(3',5'-di-t-butyl-2'-hydroxyphenyl)-5-chlorobenzotriazole; 2-(3'-t-butyl-2'-hydroxy-5'-methylphenyl)-5-chlorobenzotriazole; 2-(3'-s-butyl-5'-t-butyl-2'-hydroxyphenyl)benzotriazole; 2-(21-hydroxy-4'-octyloxyphenyl)benzotriazole; 2-(3',5'-di-t-amyl-2'-hydroxyphenyl)benzotriazole; 2-[3',5'-bis(α,α-dimethylbenzyl)-2'-hydroxyphenyl]benzotriazole; 2-[3'-t-butyl-2'-hydroxy-5'-(2-octyloxycarbonylethyl)phenyl]-5-chlorobenzotriazole, 2-[3'-t-butyl-5'-(2-(2-ethylhexyloxy) carbonylethyl)-2'-hydroxyphenyl]-5-chlorobenzotriazole, 2-[3'-t-butyl-2'-hydroxy-5'-(2-methoxycarbonylethyl) phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5'-(2-octyloxycarbonylethyl)phenyl] benzotriazole, 2-[3'-t-butyl-5'-(2-(2-ethylhexyloxy) carbonylethyl)-2'-hydroxyphenyl]benzotriazole, 2-(3'-dodecyl-2'-hydroxy-5'-methylphenyl)benzotriazole; 2-[3'-t-butyl-2'-hydroxy-5'-(2-isooctyloxycarbonylethyl) phenyl]benzotriazole, 2,2'-methylene-bis[4-(1,1,3,3-tetramethylbutyl)-6-benzotriazol-2-yl-phenol]; transesterification product of 2-[3'-t-butyl-5'-(2-methoxycarbonylethyl)-2'-hydroxyphenyl]-2H-benzotriazole with polyethylene glycol 300; [R—$CH_2CH_2$—COO$(CH_2)_3$—]$_2$— wherein R=3'-t-butyl-4-hydroxy-5'-2H-benzotriazol-2-yl-phenyl; 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl) phenyl]benzotriazole.

2.2 Derivatives of 2-hydroxybenzophenones such as, for example: 4-hydroxy-; 4-methoxy-; 4-octyloxy-; 4-decyloxy-; 4-dodecyloxy-; 4-benzyloxy-; 4,2',4'-trihydroxy-; 2'-hydroxy-4,4'-dimethoxy.

2.3 Esters of benzoic acids, optionally substituted, such as, for example: phenyl salicylate, 4-t-butylphenyl salicylate, octylphenyl salicylate, benzoyl resorcinol, bis(4-t-butylbenzoyl)resorcinol, dibenzoyl resorcinol, 2,4-di-t-butylphenyl-3,5-di-t-butyl-4-hydroxybenzoate, hexadecyl-3,5-di-t-butyl-4-hydroxybenzoate, octadecyl-3,5-di-t-butyl-4-hydroxybenzoate, 2-methyl-4,6-di-t-butylphenyl-3,5-di-t-butyl-4-hydroxybenzoate.

2.4 Acrylates such as, for example, ethyl or iso-octyl α-cyano-β,β-diphenylacrylate; methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

2.5 Nickel compounds such as, for example, Ni-complexes of 2,2'-thio-bis-[4-(1,1,3,3-tetramethylbutyl)phenol], for example 1:1 or 1:2 complexes, with or without additional ligands such as n-butylamine, triethanolamine or N-cyclohexyldiethanolamine, nickel dibutyldithiocarbamate, nickel salts of monoalkyl esters of 4-hydroxy-3,5-di-t-butyl-benzylphosphonic acid, such as methyl or ethyl esters, nickel complexes with ketoximes such as 2-hydroxy-4-methylphenyl undecyl ketoxime, nickel complexes of 1-phenyl-4-lauroyl-5-hydroxypyrazol with or without additional ligands.

2.6 Sterically hindered amines and their N-alkoxy derivatives such as, for example: poly-methylpropyl-3-oxy-[4-(2,2,6,6-tetramethyl)piperidinyl]siloxane, polymethylpropyl-3-oxy-[4-(1,2,2,6,6-pentamethyl) piperidinyl]siloxane, bis-(2,2,6,6-tetramethyl-4-piperidinyl)sebacate; bis(2,2,6,6-tetramethyl-4-piperidinyl)succinate; bis (1,2,2,6,6-pentamethyl-4-piperidinyl)sebacate; bis(1-octyloxy-2,2,6,6-tetramethyl-4-piperidyl)sebacate; bis(1,2,2,6,6-pentamethyl-4-piperidyl)-n-butyl-3,5-di-t-but-yl-4-hydroxybenzylmalonate; condensation product between 1-(2-hydroxyethyl)-2,2,6,6-tetra-4-hydroxypiperidine and succinic acid; condensation product, linear or cyclic, between N,N'-bis(2,2,6,6-tetramethyl-4-piperidyl)

hexamethylendiamine and 4-t-octylamino-2,6-dichloro-1,3,5-s-triazine; tris(2,2,6,6-tetramethyl-4-piperidyl) nitrilotriacetate; tetrakis(2,2,6,6-tetramethyl-4-piperidinyl)-1,2,3,4-butanetetracarboxylate; 1,1'-(1,2-ethanodiyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-t-butylbenzyl)malonate; 3-n-octyl-7,7,9,9-tetramethyl-1,3,8-triazaspiro[4.5]decane-2,4-dione; bis(1-octyloxy-2,2,6,6-tetramethylpiperidyl)sebacate; bis(1-octyloxy-2,2,6,6-tetramethylpiperidyl)succinate; condensation product, linear or cyclic, between N,N'-bis(2,2,6,6-tetramethyl-4-piperidyl)hexamethylene-diamine and 4-morpholine-2,6-dichloro-1,3,5-triazine; condensation product between 2-chloro-4,6-di-(4-n-butylamino-2,2,6,6-tetramethylpiperidyl)-1,3,5-triazine and 1,2-bis(3-aminopropylamino) ethane; condensation product between 2-chloro-4,6-di-(4-n-butylamino-1,2,2,6,6-pentamethylpiperidyl)-1,3,5-triazine and 1,2-bis(3-aminopropylamino)ethane; 8-acetyl-3-dodecyl-7,7,9,9-tetramethyl-1,3,8-triazaspiro-[4.5]decane-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl)pyrrolidin-2,5-dione; mixture of 4-hexadecyloxy- and 4-stearyloxy-2,2,6,6-tetramethylpiperidine; condensation product between N-N'-bis(2,2,6,6-tetramethyl-4-piperidyl)hexamethylenediamine and 4-cyclohexylamino-2,6-dichloro-1,3,5-triazine; condensation product between 1,2-bis(3-aminopropylamino)ethane and 2,4,6-trichloro-1,3,5-triazine, as well as 4-butylamino-2,2,6,6-tetramethylpiperidine (CAS Reg. Nr. [136504-96-6]; N-(2,2,6,6-tetramethyl-4-piperidyl)-n-dodecylsuccinimide; N-(1,2,2,6,6-pentamethyl-4-piperidyl)-n-dodecylsuccinimide; 2-undecyl-7,7,9,9-tetramethyl-1-oxa-3,8-diaza-4-oxospiro[4,5]decane; reaction product between 7,7,9,9-tetramethyl-2-cycloundecyl-1-oxa-3,8-diaza-4-oxospiro-[4,5]decane and epichlorohydrin; 1,1-bis(1,2,2,6,6-pentamethyl-4-piperidyloxycarbonyl)-2-(4-methoxyphenyl)-ethene; N,N'-bis-formyl-N,N'-bis(2,2,6,6-tetramethyl-4-piperidyl)hexamethylenediamine; diester of 4-methoxy-methylenemalonic acid with 1,2,2,6,6-pentamethyl-4-hydroxypiperidine; reaction product of maleic anhydride/α-olefin copolymer with 2,2,6,6-tetramethyl-4-aminopiperidine or with 1,1,2,2,6-pentamethyl-4-aminopiperidine.

2.7 Oxamides such as, for example: 4,4'-dioctyloxyoxanilide; 2,2'-diethoxyoxanilide; 2,2'-dioctyloxy-5,5'-di-t-butoxanilide; 2,2'-didodecyloxy-5,5'-di-t-butylooxanilide; 2-ethoxy-2'-ethyloxanilide; N,N'-bis(3-dimethylaminopropyl)oxamide; 2-ethoxy-5-t-butyl-2'-ethoxanilide and its mixtures with 2-ethoxy-2'-ethyl-5,4'-di-t-butoxanilide; and mixtures of di-substituted ortho- and para-methoxy oxanilides and mixtures of di-substituted ortho and para-ethoxy oxanilides.

2.8 2-(2-hydroxyphenyl)-1,3,5-triazines such as, for example: 2,4,6-tris(2-hydroxy-4-octyloxyphenyl)-1,3,5-triazine; 2-(2-hydroxy-4-octyloxyphenyl)-4,6-bis(2,4-dimethylphenyl)-1,3,5-triazine; 2-(2,4-dihydroxyphenyl)-4,6-bis(2,4-dimethylphenyl)-1,3,5-triazine; 2,4-bis-(2-hydroxy-4-propyloxyphenyl)-6-(2,4-dimethylphenyl)-1,3,5-triazine; 2-(2-hydroxy-4-octyloxyphenyl)-4,6-bis(4-methylphenyl)-1,3,5-triazine; 2-(2-hydroxy-4-dodecyloxyphenyl)-4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)phenyl]-4,6-bis-(2,4-dimethylphenyl)-1,3,5-triazine; 2-(2-hydroxy-4-tridecyloxyphenyl)-4,6-bis(2,4-dimethylphenyl)-1,3,5-triazine; 2-[4-(dodecyloxy/tridecyloxy-2-hydroxypropoxy)-2-hydroxyphenyl]-4,6-bis(2,4-dimethylphenyl)-1,3,5-triazine; 2-[2-hydroxy-4-(2-hydroxy-3-dodecyloxypropoxy)phenyl]-4,6-bis(2,4-dimethylphenyl)-1,3,5-triazine; 2-(2-hydroxy-4-hexyloxyphenyl)-4,6-diphenyl-1,3,5-triazine; 2-(2-hydroxy-4-methoxyphenyl)4,6-diphenyl-1,3,5-triazine; 2,4,6-tris[2-hydroxy-4-(3-butoxy-2-hydroxypropoxy)phenyl]-1,3,5-triazine; 2-(2-hydroxyphenyl)-4-(4-methoxyphenyl)-6-phenyl-1,3,5-triazine; 2-{2-hydroxy-4-[3-(2-ethylhexyl-1-oxy)-2-hydroxypropyloxy]phenyl}4,6-bis(2,4-dimethylphenyl)-1,3,5-triazine.

3. "Metal-deactivators" such as, for example: N,N-diphenyloxamide, N-salicylal-N'-salicyloyl-hydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis(benzylidene)oxallyl dihydrazide, oxanilide, isophthaloyl dihydrazide, sebacoyl bisphenylhydrazide, N,N'-diacetyladipoyl dihydrazide, N,N'-bis(salicyloyl)oxallyl dihydrazide, N,-N'-bis(salicyloyl)thiopropionyl dihydrazide.

4. Phosphites and phosphonites such as, for example: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-t-butylphenyl) pho-sphite, diisodecyl pentaerythritol diphosphite, bis(2,4-di-t-butylphenyl) pentaerythritol diphosphite, bis(2,6-di-t-butyl-4-methylphenyl)pentaerythritol diphosphite, diisodecyloxypentaerythritol diphosphite, bis(2, 4-di-t-butyl-6-methylphenyl)pentaerythritol diphosphite, bis [2,4,6-tris(t-butylphenyl)]pentaerythritol diphosphite, tristearyl sorbitol triphosphite, tetrakis-(2,4-di-t-butylphenyl)-4,4'-diphenylenediphosphonite, 6-isooctyloxy-2,4,8,10-tetra-t-butyl-12H-dibenzo-[d,g]-1,3,2-dioxaphosphocine, 6-fluoro-2,4,8,10-tetra-t-butyl-12-methyldibenzo[d,g]-1,3,2-dioxaphosphocine, bis-(2,4-di-t-butyl-6-methylphenyl)methylphosphite, bis(2,4-di-t-butyl-6-methylphenyl)ethylphosphite; 2,2',2"-nitrilotriethyl-tris (3,3',5,5'-tetra-t-butyl-1,1'-biphenyl-2,2'-diyl)-phosdrazide, phite; 2-ethylhexyl-(3,3',5,5'-tetra-t-butyl-1,1'-biphenyl-2,2'-diyl)phosphite.

5. Hydroxylamines such as, for example: N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; N,N-di-alkylhydroxylamines deriving from hydrogenated tallow amines.

6. Nitrons such as, for example: N-benzyl-α-phenylnitron; N-ethyl-α-methyl-nitron; N-octyl-α-heptyl-nitron; N-lauryl-α-undecyl-nitron; N-tetradecyl-α-tridecyl-nitron; N-hexadecyl-α-pentadecyl-nitron; N-octadecyl-α-heptadecyl-nitron; N-hexadecyl-α-heptadecyl-nitron; N-octadecyl-α-pentadecyl-nitron; N-heptadecyl-α-heptadecylnitron; N-octadecyl-α-hexadecyl-nitron; nitrons deriving from hydrogenated tallow amines.

7. Thiosynergizing agents such as, for example: dilauryl thiodipropionate; distearyl thiodipropionate.

8. Agents which are capable of destroying peroxides such as, for example, esters of 0-thiodipropionic acid such as lauryl, stearyl, myristyl or tridecyl esters, mercaptobenzimidazole or zinc salt of 2-mercaptobenzimidazole, zinc dibutyldithiocarbamate, dioctadecyldisulfide, pentaerythritol tetrakis(β-dodecylmercapto)propionate.
9. Polyamide stabilizers such as, for example, copper salts combined with compounds of iodine and/or phosphorous, divalent manganese salts.
10. Basic co-stabilizers such as, for example: melamine, polyvinylpyrrolidone, dicyanodiamide, triallyl cyanurate, derivatives of urea, derivatives of hydrazine, amines, polyamides, polyurethanes, salts of alkaline metals and salts of earth-alkaline metals of fatty acids with a high molecular weight such as, for example, Ca-stearate, Zn-stearate, Mg-stearate, Mg-behenate, Na-ricinoleate, K-palmitate, antimonium-pyrocatecholate, tin-pyrocatecholate, zinc-pyrocatecholate.
11. Nucleating agents such as, for example: inorganic substances such as talc, metal oxides (for example, titanium dioxide or magnesium oxide), phosphates, carbonates or sulfates (preferably of earth-alkaline metals); organic compounds such as mono- or polycarboxylic acids and their salts (for example, 4-t-butylbenzoic acid, adipic acid, diphenylacetic acid, sodium succinate, sodium benzoate); polymeric compounds such as ionic copolymers ("ionomers").
12. Fillers and reinforcing agents such as, for example: calcium carbonate, silicates, glass fibres, glass beads, asbestos, talc, kaolin, mica, barium sulfate, metal oxides and hydroxides, carbon black, graphite, wood flour and flours or fibres of other natural products, synthetic fibres.
13. Other additives such as, for example: plasticizers, dyes, lubricants, emulsifying agents, Theological additives, catalysts, slip agents, optical brighteners, flame-retardants (for example bromurates, chlorurates, phosphorates and phosphorous/halogen mixtures), antistatic agents, blowing agents.

The above stabilizers (co-stabilizers) can be optionally added to the organic polymers to be stabilized in a quantity ranging from 0.01% to 10% with respect to the total weight of the organic polymer to be stabilized.

The fillers and reinforcing agents described above under point (12) such as, for example, talc, calcium carbonate, mica or kaolin, can be optionally added to the organic polymers to be stabilized in a quantity ranging from 0.01% to 40% with respect to the total weight of the organic polymer to be stabilized.

The fillers and reinforcing agents described above under point (12) such as, for example, metal hydroxides, in particular, aluminum hydroxide or magnesium hydroxide, can be optionally added to the organic polymers to be stabilized in a quantity ranging from 0.01% to 60% with respect to the total weight of the organic polymer to be stabilized.

Carbon black as filler can be optionally added to the organic polymers to be stabilized in a quantity ranging from 0.01% to 5% with respect to the total weight of the organic polymer to be stabilized.

Glass fibers as reinforcing agents can be optionally added to the organic polymers to be stabilized in a quantity ranging from 0.01% to 20% with respect to the total weight of the organic polymer to be stabilized.

The stabilizing mixtures, object of the present invention, in addition to compounds (a), (b), (c) and, optionally (d), may contain salts of earth-alkaline metals of fatty acids such as, for example, calcium stearate.

As is known, mixtures comprising phenol antioxidants and secondary antioxidants such as phosphites or phosphonites, are generally used as process stabilizers for organic polymers such as, for example, polyolefins. Sometimes, during the processing, the polyolefins are subjected to very high temperatures (for example 280° C.) and therefore require good process stabilizers. The stabilizing mixtures, object of the present invention, are also particularly useful as process stabilizers when the process is carried out at a high temperature, for example, at 300° C. Another advantage of these stabilizing mixtures is that they can be used in small quantities: it is thus possible to operate at lower concentrations of antioxidants with respect to those normally used. The use of low concentrations of compounds of the group of pyrazolones (a) allows the concentration of all the other stabilizers present in the mixture to be reduced, which is consequently also an advantage from an economic point of view.

The incorporation of compounds (a), (b), (c) and, optionally, (d), as single compounds or mixed with each other and possibly other stabilizers (co-stabilizers), in the organic polymers to be stabilized, can be carried out according to the methods known in the art, for example, before or during the processing, or the mixture dissolved or dispersed in a solvent, before or after its evaporation, can be applied to the organic polymer to be stabilized. The stabilizing mixture, object of the present invention, can also be used in masterbatch form containing from 2.5% to 25% by weight of said mixture.

The above mixture, optionally in the presence of other stabilizers (co-stabilizers), can also be added to the organic polymers to be stabilized, either after or during polymerization or before cross-linking.

The above mixture, optionally in the presence of other stabilizers (co-stabilizers), can be added to the organic polymers to be stabilized, in pure form or encapsulated in waxes, oils or polymers.

The above mixture, optionally in the presence of other stabilizers (co-stabilizers) which can be diluted or used in the molten state, can be sprayed into the organic polymers to be stabilized. This spraying can be advantageously effected during the deactivation of the polymerization catalyst, as the spraying can be effected using, for example, the vapor used for the deactivation.

In the case of spherically polymerized polyolefins, it may be advantageous to add the above mixture, optionally in the presence of other stabilizers (co-stabilizers), by means of spraying.

The organic polymers stabilized as described above can be used in a wide variety of forms such as, for example, films, fibers, tapes, moulding compositions, profiles, ligands for coating materials such as powder coatings, adhesives or plaster, in particular.

The present invention also relates to a method for stabilizing organic polymers against degradation caused by oxygen, heat and/or light, which comprises the addition or application to said organic polymers of the stabilizing mixture, object of the present invention.

Some illustrative but non-limiting examples are provided hereunder for a better understanding of the present invention and for its embodiment.

EXAMPLE 1

Stabilization of Polypropylene Subjected to Multiple High Temperature Extrusions 100 g of polypropylene in powder (Moplen FLF 20 of Montell Italia), having a melt flow index (MFI) of 12 g/min. measured in accordance with the regulation ASTM D638 at 230° C. with 2.16 kg, are mixed with 0.05 g of calcium stearate and with the other stabilizers indicated in Table 1, which also specifies the quantities of stabilizers used.

The above homogenized mixture is fed to a Brabender laboratory extruder with a feeding screw having a length of 475 mm, a diameter of 19 mm, a compression ratio of 1:4, which has the possibility of differentiated heating in four different zones of the feeding screw. The mixture is extruded through a hole having a diameter of 2 mm, with a screw rotation rate of 60 rpm and a temperature profile of 190° C., 235° C., 270° C., 310° C. and the MFI values obtained, measured as described above, at the $1^{st}$, $3^{rd}$ and $5^{th}$ extrusion, are indicated in Table 1.

TABLE 1

| STABILIZING MIXTURE | MFI | | |
|---|---|---|---|
| | $1^{st}$ | $3^{rd}$ | $5^{th}$ |
| Anox 20 (0.05%) Alkanox 240 (0.05%) | 16.5 | 26.1 | 37.3 |
| Anox 20 (0.04%) Alkanox 240 (0.04%) Compound (Ia) (0.02%) | 13.4 | 18.4 | 24.1 |
| Anox 20 (0.04%) Alkanox 240 (0.04%) Compound (Ib) (0.02%) | 13.4 | 18.4 | 25.9 |

EXAMPLE 2

Stabilization of Polypropylene Subjected to Multiple Extrusions under High Mechanical Rriction Conditions 100 g of polypropylene in powder form (Moplen FLF 20 of Montell Italia), having a melt flow index (MFI) equal to 12 g/min. measured in accordance with the regulation ASTM D638 at 230° C. with 2.16 kg, are mixed with 0.05 g of calcium stearate and with the other stabilizers indicated in Table 2: Table 2 also specifies the quantities of stabilizers used.

The above homogenized mixture is fed to a Brabender laboratory extruder with a feeding screw having a length of 475 mm, a diameter of 19 mm, a compression ratio of 1:4, which has the possibility of differentiated heating in four different zones of the feeding screw. The mixture is extruded through a hole having a diameter of 2 mm, with a screw rotation rate of 120 rpm and a temperature profile of 190° C., 235° C., 270° C., 270° C. and the MFI values obtained, measured as described above, at the $1^{st}$, $3^{rd}$ and $5^{th}$ extrusion, are indicated in Table 2.

TABLE 2

| STABILIZING MIXTURE | MFI | | |
|---|---|---|---|
| | $1^{st}$ | $3^{rd}$ | $5^{th}$ |
| Anox 20 (0.05%) Alkanox 240 (0.05%) | 12.7 | 14.6 | 16.8 |
| Anox 20 (0.04%) Alkanox 240 (0.04%) Compound (Ib) (0.02%) | 11.6 | 12.7 | 14.5 |
| Anox 20 (0.05%) Alkanox P-24 (0.05%) | 12.3 | 13.6 | 15.4 |
| Anox 20 (0.04%) Alkanox P-24 (0.04%) Compound (Ib) (0.02%) | 10.8 | 12.0 | 13.7 |

EXAMPLE 3

Stabilization of Polypropylene Subjected to Multiple Extrusions 100 g of polypropylene in powder form (Moplen FLF 20 of Montell Italia), having a melt flow index (MFI) equal to 12 g/min. measured in accordance with the regulation ASTM D638 at 230° C. with 2.16 kg, are mixed with 0.05 g of calcium stearate and with the other stabilizers indicated in Table 3: Table 3 also specifies the quantities of stabilizers used.

The above homogenized mixture is fed to a Brabender laboratory extruder with a feeding screw having a length of 475 mm, a diameter of 19 mm, a compression ratio of 1:4, which has the possibility of differentiated heating in four different zones of the feeding screw. The mixture is extruded through a hole having a diameter of 2 mm, with a screw rotation rate of 60 rpm and a temperature profile of 190° C., 235° C., 270° C., 270° C. and the MFI values obtained, measured as described above, at the $1^{st}$, $3^{rd}$ and $5^{th}$ extrusion, are indicated in Table 3.

TABLE 3

| STABILIZING MIXTURE | MFI | | |
|---|---|---|---|
| | $1^{st}$ | $3^{rd}$ | $5^{th}$ |
| Anox 20 (0.05%) Alkanox 240 (0.05%) | 13.7 | 16.0 | 19.1 |
| Anox 20 (0.04%) Alkanox 240 (0.04%) Compound (Ia) (0.02%) | 13.1 | 15.2 | 17.4 |
| Anox 20 (0.04%) Alkanox 240 (0.04%) Compound (Ib) (0.02%) | 11.7 | 12.6 | 14.0 |

EXAMPLE 4

Stabilization of Polypropylene Subjected to Multiple Extrusions 100 g of polypropylene in powder form (Moplen FLF 20 of Montell Italia), having a melt flow index (MFI) equal to 12 g/min. measured in accordance with the regulation ASTM D638 at 230° C. with 2.16 kg, are mixed with 0.05 g of calcium stearate and with the other stabilizers indicated in Table 4: Table 4 also specifies the quantities of stabilizers used.

The above homogenized mixture is fed to a Brabender laboratory extruder with a feeding screw having a length of 475 mm, a diameter of 19 mm, a compression ratio of 1:4, which has the possibility of differentiated heating in four different zones of the feeding screw. The mixture is extruded through a hole having a diameter of 2 mm, with a screw rotation rate of 60 rpm and a temperature profile of 190° C., 235° C, 250° C., 280° C. and the MFI values obtained, measured as described above, at the $1^{st}$, $3^{rd}$ and $5^{th}$ extrusion, are indicated in Table 4.

TABLE 4

| STABILIZING MIXTURE | MFI | | |
|---|---|---|---|
| | $1^{st}$ | $3^{rd}$ | $5^{th}$ |
| Anox 20 (0.05%) Alkanox 240 (0.05%) | 14.2 | 17.8 | 20.5 |
| Anox 20 (0.025%) Alkanox 240 (0.025%) | 16.9 | 25.4 | 34.1 |
| Alkanox 240 (0.025%) Compound (Ie) (0.05%) | 11.4 | 12.1 | 13.6 |
| Compound (Ie) (0.05%) | 11.6 | 13.1 | 14.8 |

EXAMPLE 5

Stabilization of Polypropylene Subjected to Multiple Extrusions 100 g of polypropylene in powder form (Moplen FLF 20 of Montell Italia), having a melt flow index (MFI) equal to 12 g/min. measured in accordance with the regulation ASTM D638 at 230° C. with 2.16 kg, are mixed with 0.05 g of calcium stearate and with the other stabilizers indicated in Table 5: Table 5 also specifies the quantities of stabilizers used.

The above homogenized mixture is fed to a Brabender laboratory extruder with a feeding screw having a length of 475 mm, a diameter of 19 mm, a compression ratio of 1:4, which has the possibility of differentiated heating in four different zones of the feeding screw. The mixture is extruded through a hole having a diameter of 2 mm, with a screw rotation rate of 60 rpm and a temperature profile of 190° C., 235° C., 250° C., 280° C. and the MFI values obtained, measured as described above, at the $1^{st}$, $3^{rd}$ and $5^{th}$ extrusion, are indicated in Table 5.

TABLE 5

| STABILIZING MIXTURE | MFI | | |
|---|---|---|---|
| | $1^{st}$ | $3^{rd}$ | $5^{th}$ |
| Anox 20 (0.0375%) Alkanox 240 (0.0375%) | 14.5 | 18.7 | 23.3 |
| Anox 20 (0.025%) Alkanox 240 (0.025%) Compound (Ie) (0.010%) | 12.1 | 14.1 | 17.6 |
| Anox 20 (0.025%) Alkanox 240 (0.025%) Compound (If) (0.010%) | 11.6 | 12.6 | 14.8 |

What is claimed is:

1. Stabilizing mixtures for organic polymers comprising:
   (a) at least one compound belonging to the group of pyrazolones;
   (b) at least one compound belonging to the group of organic phosphites or phosphonites;
   (c) at least one compound belonging to the group of sterically hindered phenols; and, optionally,
   (d) at least one compound belonging to the group of sterically hindered amines, said compounds belonging to the group of pyrazolones (a) being selected from those having general formula (I) or (II):

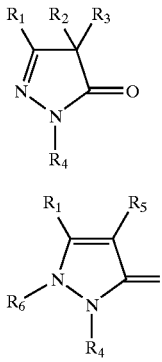

(I)

(II)

wherein
   $R_1$ represents a hydrogen atom; a linear or branched $C_1$–$C_{18}$ alkyl group; a linear or branched $C_2$–$C_{18}$ alkenyl group; a linear or branched $C_2$–$C_{18}$ alkynyl group; a linear or branched $C_2$–$C_8$ alkoxyalkyl group; a $C_5$–$C_8$ cycloalkyl group; a heterocyclic group with 5 or 6 atoms containing at least one heteroatom selected from the group consisting of oxygen, nitrogen and sulfur, a $C_6$–$C_{20}$ aryl group; an amine group having general formula (III):

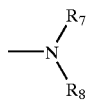

or an acid or ester group having general formula (IV) or (V):

 (IV):

 (V); wherein $R_2$, $R_3$, $R_4$, $R_5$ and $R_6$, the same or different, each represents a hydrogen atom; a linear or branched $C_1$–$C_{18}$ alkyl group; a linear or branched $C_2$–$C_{18}$ alkynyl group; a linear or branched $C_2$–$C_{18}$ alkenyl group; a $C_5$–$C_8$ cycloalkyl group, or a $C_6$–$C_{20}$ aryl group;

or, $R_2$ and $R_3$, considered jointly with the carbon atom to which they are bound, represent a $C_5$–$C_8$ cycloalkyl group;

$R_7$, $R_8$, $R_9$ and $R_{10}$, the same or different, each represents a hydrogen atom; a linear or branched $C_1$–$C_{18}$ alkyl group; a $C_5$–$C_8$ cycloalkyl group; or a $C_6C_{20}$ aryl group;

or, $R_7$ and $R_8$, considered jointly with the nitrogen atom to which they are bound, represent a heterocyclic group with 5 or 6 atoms optionally containing another heteroatom selected from oxygen, nitrogen or sulfur.

2. The stabilizing mixtures for organic polymers according to claim 1, wherein the compounds belonging to the group of organic phosphites or phosphonites (b) are selected from those having the following general formulae (VI)–(XII):

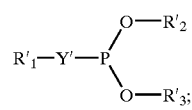

(VI)

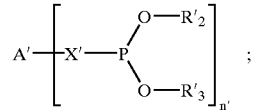

(VII)

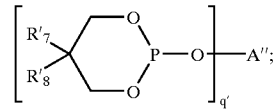

(VIII)

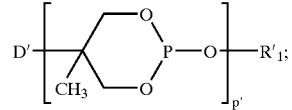

(IX)

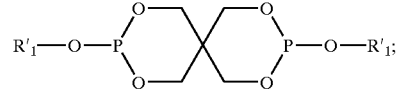

(X)

-continued

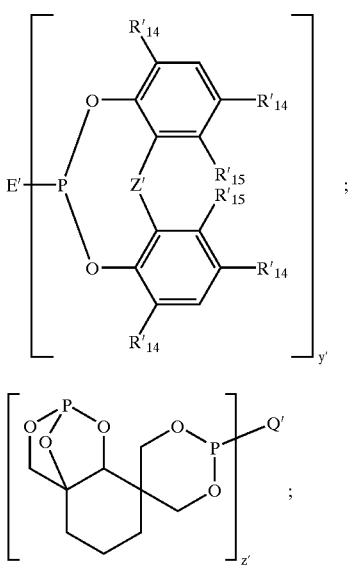
(XI)

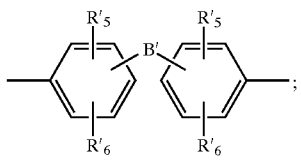
(XII)

wherein:
n' is 2, 3 or 4;
p' is 1 or 2;
q' is 2 or 3;
r' is an integer ranging from 4 to 12, extremes included;
y' is 1, 2 or 3;
z' is an integer ranging from 1 to 6, extremes included;
when n' is 2, A' represents a $C_2$–$C_{18}$ alkylene group; a $C_2$–$C_{12}$ alkylene group containing an oxygen atom, a sulfur atom, or an —NR'$_4$— group;
a group having general formula (XIII):

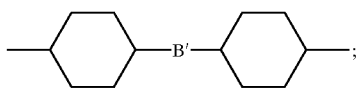
(XIII)

a group having general formula (XIV):

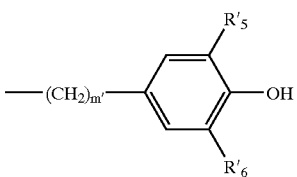
(XIV)

a phenylene group;
when n' is 3, A' represents a group having general formula —$C_{r'}H_{2r'-1}$— wherein r' has the same values described above;
when n' is 4, A' represents a group having the formula:

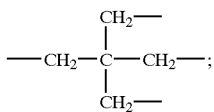

A" has the same meanings defined above for A' when n' is 2;

B' represents a direct bond; one of the following groups: —CH$_2$—, —CHR'$_4$—, —CR'$_1$R'$_4$—; a sulfur atom; a $C_5$–$C_7$ cycloalkylidene group; a cyclohexylidene group substituted with 1–4 $C_1$–$C_4$ alkyl groups in position 3, 4 and/or 5;

when p' is 1, D' represents a methyl group; and, when p' is 2, D' represents a —CH$_2$OCH$_2$— group;

when y' is 1, E' represents a $C_1$–$C_{18}$ alkyl group; an —OR'$_1$ group; a halogen atom;

when y' is 2, E' represents an —O—A"—O— group;

when y' is 3, E' represents one of the following groups: R'$_4$C(CH$_2$O—)$_3$, N(CH$_2$CH$_2$O—)$_3$;

Q' represents a radical of an alcohol or a phenol with a valence z', said radical being attached to the phosphorous atom by means of an oxygen atom;

R'$_1$, R'$_2$ and R'$_3$, each independently, represent a hydrogen atom; a halogen atom; one of the following groups: —COOR'$_4$—, —CN—, —CONR'$_4$R'$_4$; a $C_2$–$C_{18}$ alkyl group containing an oxygen atom, a sulfur atom, an —NR'$_4$— group; a $C_7$–$C_9$ phenylalkyl group; a $C_5$–$C_{12}$ cycloalkyl group; a phenyl group or a naphthyl group, said phenyl or naphthyl groups optionally substituted with halogen atoms, or with 1–3 $C_1$–$C_{18}$ alkyl or alkoxyl groups or with $C_7$–$C_9$ phenylalkyl groups; or they represent a group having general formula (XV):

$$-(CH_2)_{m'}-\underset{R'_6}{\overset{R'_5}{\bigcirc}}-OH \qquad (XV)$$

wherein m' represents an integer ranging from 3 to 6, extremes included;

R'$_4$ represents a hydrogen atom; a $C_1$–$C_{18}$ alkyl group; a $C_5$–$C_{12}$ cycloalkyl group; a $C_7$–$C_9$ phenylalkyl group;

R'$_5$ and R'$_6$ each independently, represent a hydrogen atom; a $C_1$–$C_8$ alkyl group; a $C_5$–$C_6$ cycloalkyl group;

when q' is 2, R'$_7$ and R'$_8$ each independently, represent a $C_1$–$C_4$ alkyl group; or, considered jointly, they represent a 2,3-dihydropentamethylene group;

when q' is 3, R'$_7$ and R'$_8$ represent a methyl group;

R'$_{14}$ represents a hydrogen atom; a $C_1$–$C_9$ alkyl group; a cyclohexyl group;

R'$_{15}$ represents a hydrogen atom; a methyl group; or, when two or more R'$_{14}$ and R'$_{15}$ groups are present, said groups are the same or different to each other;

X' and Y' represent a direct bond; an oxygen atom;

Z' represents a direct bond; a methylene group; a —C(R'$_{16}$)$_2$— group; a sulfur atom;

R'$_{16}$ represents a $C_1$–$C_8$ alkyl group.

3. The stabilizing mixtures for organic polymers according to claim 1, wherein the compounds belonging to the group of sterically hindered phenols (c) are selected from those having general formula (XIX):

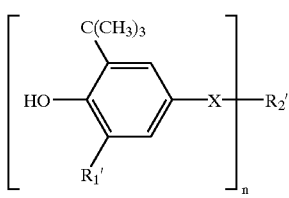
(XIX)

wherein:
- $R_1'$ represents a $C_1$–$C_4$ alkyl group;
- n is 1, 2, 3 or 4;
- X represents a methylene group; or a group having general formula (XX) or (XXI):

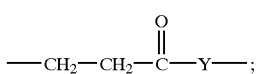
(XX)

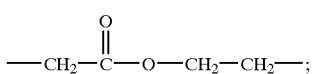
(XXI)

Y represents an oxygen atom; an —NH— group;

when n is 1, X represents a group having general formula (XX) wherein Y is attached to $R_2'$ and $R_2'$ represents a $C_1$–$C_{25}$ alkyl group;

when n is 2, X represents a group having general formula (XX) wherein Y is attached to $R_2'$ and $R_2'$ represents a $C_2$–$C_{12}$ alkylene group; a $C_4$–$C_{12}$ alkylene group containing one or more oxygen or sulfur atoms; or, when Y represents an —NH— group, $R_2'$ represents a direct bond;

when n is 3, X represents a methylene group; a group having general formula (XXI) wherein the ethylene group is bound to $R_2'$ and $R_2'$ represents a group having formula (XXII):

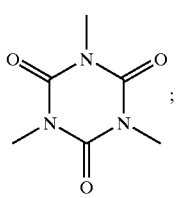
(XXII)

when n is 4, X represents a group having general formula (XX) wherein Y is bound to $R_2'$ and $R_2'$ represents a $C_4$–$C_{10}$ alkane-tetrayl group.

4. The stabilizing mixtures for organic polymers according to claim 1, wherein the compounds belonging to the group of sterically hindered phenols (c) consist of reactive antioxidant compounds containing a sterically hindered phenol group having general formula (I') or (I'a):

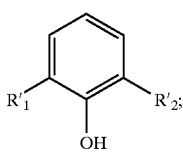
(I')

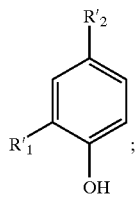
(I'a)

and more specifically, of reactive antioxidant compounds containing sterically hindered phenol groups having general formula (I') and (I'a) selected from those having general formula (II') or (II'a):

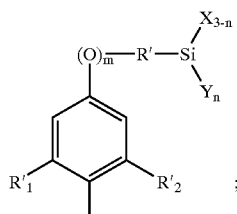
(II')

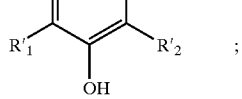
(II'a)

5. The stabilizing mixtures for organic polymers according to claim 1, wherein the compounds belonging to the group of sterically hindered amines (d) are selected from those comprising at least one group having general formula (XXIII) or (XXIV):

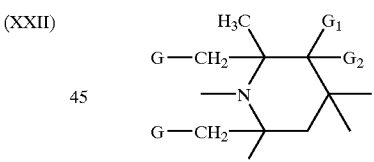
(XXIII)

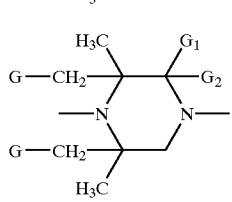
(XXIV)

wherein:
- G represents a hydrogen atom; or a methyl group;
- $G_1$ and $G_2$, the same or different, represent a hydrogen atom; a methyl group; or they jointly represent an oxygen atom.

6. The stabilizing mixtures for organic polymers according to claim 1, wherein the compounds belonging to the group of sterically hindered amines (d) are selected form compounds comprising at least one group having general formula (XXIII) or (XXIV):

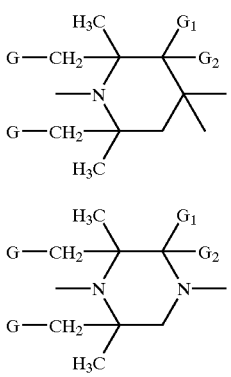
(XXIII)

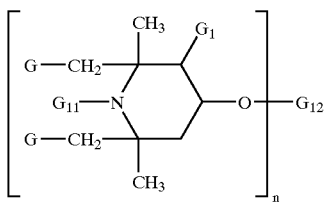
(XXIV)

wherein:

G represents a hydrogen atom or a methyl group;

G1 and G2, the same or different, each represents a hydrogen atom or a methyl group; or they jointly represent an oxygen atom.

7. The stabilizing mixtures for organic polymers according to claim 6, wherein the compounds belonging to the group of sterically hindered amines (d) are selected from compounds (a') having general formula (XXV):

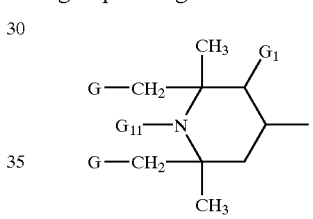
(XXV)

wherein n is a number ranging from 1 to 4, extremes included, G and $G_1$, independently, represent a hydrogen atom or a methyl; $G_{11}$ represents a hydrogen atom, O, a hydroxyl group, an NO group, a —$CH_2CN$ group, a $C_1$–$C_{18}$ alkyl group, a $C_3$–$C_8$ alkenyl group, a $C_3$–$C_8$ alkynyl group, a $C_7$–$C_{12}$ arylalkyl group, a $C_1$–$C_{18}$ alkoxyl group, a $C_5$–$C_8$ cycloalkoxyl group, a $C_7$–$C_9$ phenylalkoxyl group, a $C_1$–$C_8$ alkanoyl group, a $C_3$–$C_5$ alkenoyl group, a $C_1$–$C_{18}$ alkanoyloxyl group, a benzyloxyl group, a glycidyl group, an $OG_{11}'$ group, wherein $G_{11}'$ represents a linear or branched $C_1$–$C_{10}$ alkyl group; or a —$CH_2CH(OH)$—Z group wherein Z represents a hydrogen atom, a methyl or a phenyl, $G_{12}$, when n is 1, represents a hydrogen atom, a $C_1$–$C_{18}$ alkyl group, said alkyl group optionally containing one or more oxygen atoms, a cyanoethyl group, a benzyl, a glycidyl group, a monovalent radical of a carboxylic acid, of a carbamic acid or of an acid containing phosphorus, aliphatic, cycloaliphatic or arylaliphatic, unsaturated or aromatic, or a monovalent silyl radical, $G_{12}$, when n is 2, represents a $C_2$–$C_{12}$ alkylene group, a $C_4$–$C_{12}$ alkenylene group, a xylylene group, a divalent radical of a dicarboxylic acid, of a dicarbamic aied or of an acid containing phosphorus, aliphatic, cycloaliphatic, arylaliphatic or aromatic, or a divalent silyl radical; $G_{12}$, when n is 3, represents a trivalent radical, of an aliphatic, cycloaliphatic or aromatic tricarboxylic acid, optionally substituted in the aliphatic, cycloaliphatic or aromatic part, with a —$COOZ_{12}$ group wherein $Z_{12}$ represents a hydrogen atom, a $C_1$–$C_{20}$ alkyl group, a $C_3$–$C_{12}$ alkenyl group, a $C_5$–$C_7$ cycloalkyl group, a phenyl or a benzyl; or of an aromatic tricarbamic acid or of an acid containing phosphorus, or it represents a trivalent silyl radical; and $G_{12}$, when n is 4, is a tetravalent radical of an aliphatic, cycloaliphatic or aromatic tetracarboxylic acid.

8. The stabilizing mixtures according to claim 6, wherein the compounds belonging to the group of sterically hindered amines (d) are selected from compounds (b') having general formula (XXVI):

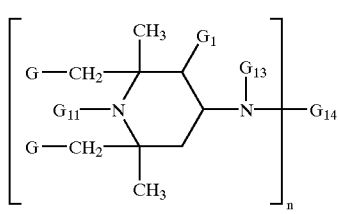
(XXVI)

wherein n is 1 or 2; G, $G_1$ and $G_{11}$ have the same meanings described above under claim 7; $G_{13}$ represents a hydrogen atom, a $C_1$–$C_{12}$ alkyl group, a $C_2$–$C_5$ hydroxyalkyl group, a $C_5$–$C_7$ cycloalkyl group, a $C_7$–$C_8$ arylalkyl group, a $C_2$–$C_{18}$ alkanoyl group, a $C_3$–$C_5$ alkenoyl group, a benzoyl group, or a group having the following general formula:

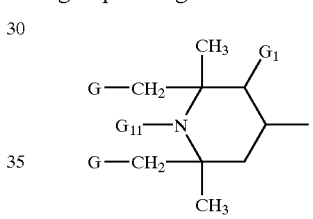

wherein G, $G_1$, $G_{11}$ have the same meanings defined above under claim 8; $G_{14}$, when n is 1, represents a hydrogen atom, a $C_1$–$C_{18}$ alkyl group, a $C_3$–$C_8$ alkenyl group, a $C_5$–$C_7$ cycloalkyl group, a $C_1$–$C_4$ alkyl group substituted with a hydroxyl group, with a cyano group, with an alkoxycarbonyl group or with a carbamide group, a glycidyl group, a group having the formula —$CH_2$—$CH(OH)$—Z or a group having the formula —$CONH$—Z wherein Z represents a hydrogen atom, a methyl or a phenyl; $G_{14}$, when n is 2, represents a $C_2$–$C_{12}$ alkylene group, a $C_6$–$C_{12}$ arylene group, a xylylene group, a group of formula —$CH_2$—$CH(OH)$—$CH_2$— or a group having the formula —$CH_2$—$CH(OH)$—$CH_2$—O—D—O— wherein D represents a $C_2$–$C_{10}$ alkylene group, a $C_6$–$C_{15}$ arylene group, a $C_6$–$C_{12}$ cycloalkylene group; or, on the condition that $G_{13}$ does not represent an alkanoyl group, an alkenoyl group or a benzoyl group, $G_{14}$ can also represent a 1-oxo-($C_2$–$C_{12}$)-alkylene group, a divalent radical of a dicarboxylic acid or of a dicarbamic acid, aliphatic, cycloaliphatic or aromatic, or also a —CO— group; or, when n is 1, $G_{13}$ and $G_{14}$ considered jointly, can also represent a divalent radical of a 1,2- or 1,3-dicarboxylic acid, aliphatic, cycloaliphatic or aromatic.

9. The stabilizing mixtures according to claim 6, wherein the compounds belonging to the group of sterically hindered amines (d) are selected from compounds (c') having general formula (XXVII):

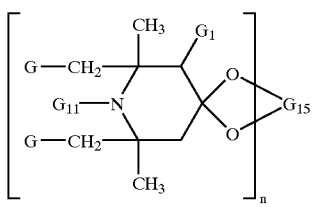

(XXVII)

wherein n is 1 or 2; G, $G_1$ and $G_{11}$ have the same meanings described above under claim 7; $G_{15}$, when n is 1, represents a $C_2$–$C_8$ alkylene or hydroxyalkylene group, or a $C_4$–$C_{22}$ acyloxyalkylene group, and, when n is 2, it is a (—$CH_2$)$_2$C($CH_2$—)$_2$ group.

10. The stabilizing mixtures according to claim 6, wherein the compounds belonging to the group of sterically hindered amines (d) arc selected from compounds (d') having general formula (XXVIIIA), (XXVIIIB) or (XXVIIIC),

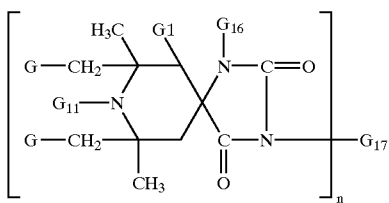

(XXVIIIA)

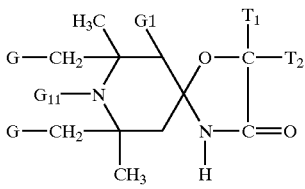

(XXVIIIB)

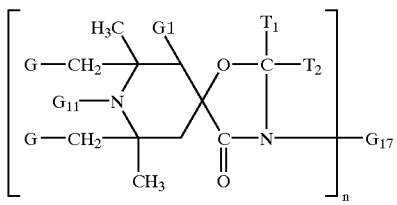

(XXVIIIC)

wherein n is 1 or 2, G, $G_1$ and $G_{11}$ have the same meanings defined above under claim 7; $G_{16}$ represents a hydrogen atom, a $C_1$–$C_{12}$ alkyl group, an allyl group, a benzyl, a glycidyl group or a $C_2$–$C_6$ alkoxyalkyl group; $G_{17}$, when n is 1, represents a hydrogen atom, a $C_1$–$C_{12}$ alkyl group, a $C_3$–$C_5$ alkenyl group, a $C_7$–$C_9$ arylalkyl group, a $C_5$–$C_7$ cycloalkyl group, a $C_2$–$C_4$ hydroxyalky group, a $C_2$–$C_6$ alkoxyalkyl group, a $C_6$–$C_{10}$ aryl group, a glycidyl group, or a group having the formula -($CH_2$)$_p$—COO—Q or —($CH_2$)$_p$—O—CO—Q wherein p is 1 or 2 and Q represents a $C_1$–$C_4$ alkyl group or a phenyl; $G_{17}$, when n is 2, represents a $C_2$–$C_{12}$ alkylene group, a $C_4$–$C_{12}$ alkenylene group, a $C_6$–$C_{12}$ arylene group, a group having the formula: —$CH_2$—CH(OH)—$CH_2$O—D—O—$CH_2$—CH(OH)—$CH_2$— wherein D represents a $C_2$–$C_{10}$ alkylene group, a $C_6$–$C_{15}$ arylene group, a $C_6$–$C_{12}$ cycloalkylene group, or a group having the formula:

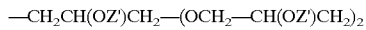

—$CH_2$CH(OZ')$CH_2$—(O$CH_2$—CH(OZ')$CH_2$)$_2$ wherein Z' represents a hydrogen atom, a $C_1$–$C_{18}$ alkyl group, an allyl, a benzyl, or a $C_2$–$C_{12}$ alkanoyl group or a benzoyl; $T_1$ and $T_2$ each independently represent a hydrogen atom, a $C_1$–$C_{18}$ all group, a $C_6$–$C_{10}$ aryl group, or a $C_7$–$C_9$ arylalkyl group, said groups optionally substituted with a halogen atom or with a $C_1$–$C_4$ alkyl group; or $T_1$ and $T_2$ considered jointly with the carbon atom to which they are bound, form a $C_5$–$C_{14}$ cyclolkane ring.

11. The stabilizing mixtures according to claim 6, wherein the compounds belonging to the group of sterically hindered amines (d) arc selected from compounds (e') having general formula (XXIX):

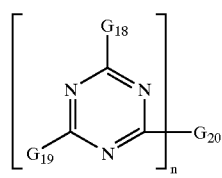

(XXIX)

wherein n is 1 or 2 and $G_{18}$ represents a group having one of the following formulae:

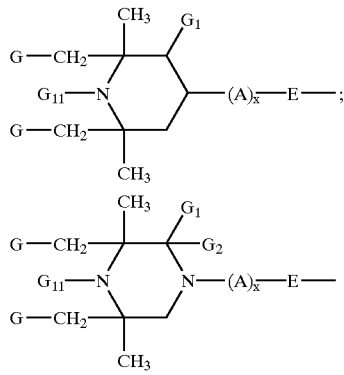

wherein G and $G_{11}$ have the same meanings defined above under claim 7; $G_1$ and $G_2$ represent a hydrogen atom, a methyl, or, considered jointly, they form a substituent =O, E represents —O— or —N$G_{13}$—; A represents a $C_2$–$C_6$ alkylene group or a —($CH_2$)$_3$—O— group; x is 0 or 1; $G_{13}$ represents a hydrogen atom, a $C_1$–$C_{12}$ alkyl group, a $C_2$–$C_5$ hydroxyalkyl group, a $C_5$–$C_7$ cycloalkyl group; $G_{19}$ has the same meanings as $G_{18}$ or it represents one of the following groups; —N$G_{21}G_{22}$, —O$G_{23}$, —NHCH$_2$O$G_{23}$, or —N(CH$_2$O$G_{23}$)$_2$; $G_{20}$, when n is 1, has the same meanings as $G_{18}$, or $G_{19}$, if n is 2, represents an —E—B—E— group wherein B represents a $C_2$–$C_8$ alkylene group optionally interrupted by 1 or 2—N($G_{21}$)— groups; $G_{21}$ represents a $C_1$–$C_{12}$ alkyl group, a cyclohexyl group, a benzyl, a $C_1$–$C_4$ hydroxyalkyl group, or a group having the following general formula:

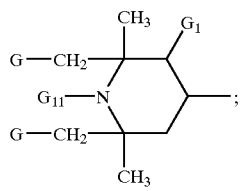

$G_{22}$ represents a $C_1$–$C_{12}$ alkyl group, a cyclohexyl group, a benzyl, a $C_1$–$C_4$ hydroxyalkyl group; $G_{23}$ represents a hydrogen atom, a $C_1$–$C_{12}$ alkyl group, a phenyl, or, $G_{21}$ and $G_{22}$, considered jointly, represent a $C_4$–$C_5$ alkylene or oxyalkylene group or a group having the formula:

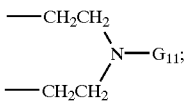

$G_{21}$ is a group having the general formula:

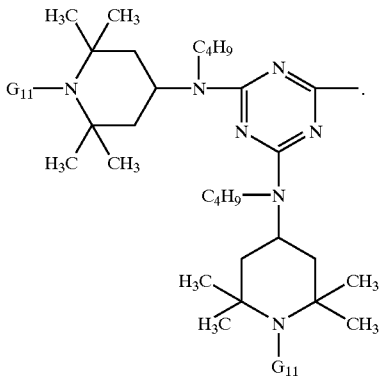

12. The stabilizing mixtures according to claim 6, wherein the compounds belonging to the group of sterically hindered amines (d) are selected from the group consisting of oligomeric or polymeric compounds whose recurrent structural unit contains a 2,2,6,6-tetramethylpiperidine radical.

13. The stabilizing mixtures according to claim 6, wherein the compounds belong to the group of sterically hindered amines (d) are selected from the group consisting of compounds having general formula (XXXIV):

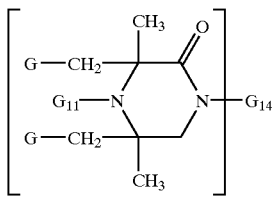

(XXXIV)

wherein n is 1 or 2, G represents a hydrogen atom or a methyl group, $G_{11}$ represents a hydrogen atom, O, a hydroxyl group, an NO group, a —$CH_2CN$ group, a $C_1$–$C_{18}$ alkyl group, a $C_3$–$C_8$ alkenyl group, a $C_3$–$C_8$ alkynyl group, a $C_7$–$C_{12}$ arylalkyl group, a $C_1$–$C_{18}$ alkoxyl group, a $C_5$–$C_8$ cycloalkoxy group, a $C_7$–$C_9$ phenylalkoxyl group, a $C_1$–$C_8$ alkanoyl group, a $C_3$–$C_5$ alkenoyl group, a $C_1$–$C_{18}$ alkanoyloxyl group, a benzyloxyl group, a glycidyl group, or an $OG_{11}'$ group, wherein $G_{11}'$ represents a linear or branched $C_1$–$C_{10}$ alkyl group; a —$CH_2CH(OH)$—Z group wherein Z represents a hydrogen atom, a methyl, or a phenyl; $G_{14}$, when n is 1, represents a hydrogen atom, a $C_1$–$C_{18}$ alkyl group, a $C_3$–$C_8$ alkenyl group, a $C_5$–$C_7$ cycloalkyl group, a $C_1$–$C_4$ alkyl group substituted with a hydroxyl group, with a cyano group, with an alkoxycarbonyl group or with a carbamide group, a glycidyl group, or a group having the formula —$CH_2$—$CH(OH)$—Z; and $G_{14}$, when n is 2, represents a $C_2$–$C_{12}$ alkylene group, a $C_6$–$C_{12}$ arylene group, a xylylene group, a group of formula —$CH_2$—$CH(OH)$—$CH_2$—, a 1-oxo-($C_2$–$C_{12}$)-alkylene group, a divalent radical of a dicarboxylic acid or of a dicarbamic acid, which is aliphatic, cycloaliphatic or aromatic, or a —CO-group.

14. The stabilizing mixtures according to claim 6, wherein the compounds belonging to the group of sterically hindered amines (d) are selected from compounds (h') having general formula (XXXV):

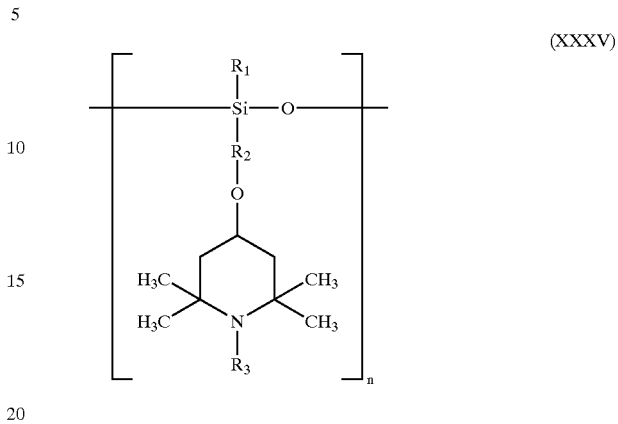

(XXXV)

wherein $R_1$ represents a $C_1$–$C_{10}$ alkyl group, a $C_5$–$C_{12}$ cycloalkyl group optionally substituted with a $C_1$–$C_4$ alkyl group, a phenyl optionally substituted with a $C_1$–$C_{10}$ alkyl group; $R_2$ represents a $C_8$–$C_{10}$ alkylene group; $R_3$ represents a hydrogen atom, a $C_1$–$C_8$ alkyl group, O, a —$CH_2CN$ group, a $C_3$–$C_6$ alkenyl group, a $C_7$–$C_9$ phenylalkyl group optionally substituted in the phenyl radical with a $C_1$–$C_4$ alkyl group, a $C_1$–$C_8$ acyl group, an —$OR'_3$ group wherein $R'_3$ represents a $C_1$–$C_{10}$ alkyl group; and $n_1$ is a number ranging from 1 to 50, extremes included.

15. Polymeric compositions containing an organic polymer and an effective quantity against the degradation caused by oxygen, heat and/or light, of one of the stabilizing mixtures according to any of the previous claims.

16. The polymeric compositions according to claim 15, wherein the stabilizing mixtures are used in a combination with other stabilizers selected from the group consisting of antioxidants, UV ray and light stabilizers, metal deactivators, phosphates and phosphonites, hydroxylamines, nitrons, thiosynergizing agents, agents capable of destroying peroxides, polyamide stabilizers, basic co-stabilizers, and nucleating agents.

17. End-products obtained from the processing of the polymeric compositions according to claim 15, said end-products selected from the group consisting of films, fibers, tapes, molding compositions, profiles, and ligands for coating materials.

18. A method for stabilizing organic polymers against degradation caused by oxygen, heat and/or light, which comprises the addition to said organic polymers of the stabilizing mixtures according to any of claims 1 and 2 to 14.

19. The stabilizing mixtures of claim 12, wherein said oligomeric or polymeric compounds are selected from the group consisting of polyesters, polyethers, polyamides, polyamines, polyurethanes, polymers, polyaminotriazines, poly(meth)acrylates; poly(meth)acrylamides, and their copolymers containing said radical.

20. The stabilizing mixtures of claim 13 wherein $G_{11}$ is hydrogen, a $C_1$–$C_4$ alkyl group, an allyl, a benzyl, an acetyl or an acryloyl.

21. The stabilizing mixtures of claim 7, wherein $G_{11}$ is hydrogen, a $C_1$–$C_4$ alkyl group, an allyl, a benzyl, an acetyl or an acryloyl; $G_{12}$, when n is 1, is a radical of an aliphatic carboxylic acid having from 2 to 18 carbon atoms, of a cycloaliphatic carboxylic acid having from 7 to 15 carbon atoms, of an α,β-unsaturated carboyxlic acid having from 3 to 5 carbon atoms, of an aromatic carboxylic acid having from 7 to 15 carbon atoms, said carboxylic acids optionally substituted in the aliphatic, cycloaliphatic or aromatic part, with 1–3—$COOZ_{12}$ groups, wherein $Z_{12}$ represents a hydrogen atom, a $C_1$–$C_{20}$ alkyl group, a $C_3$–$C_{12}$ alkenyl group, a $C_5$–$C_7$ cycloalkyl group, a phenyl or a benzyl; and $G_{12}$, when n is 2, is a radical of an aliphatic dicarboxylic acid having from 2 to 36 carbon atoms, of a cycloaliphatic or aromatic dicarboxylic acid having from 8 to 14 carbon atoms, of an aliphatic, cycloaliphatic or aromatic dicarbamic acid, having from 8 to 14 carbon atoms, said dicarboyxlic acids optionally substituted in the aliphatic, cycloaliphatic or aromatic part, with 1 or 2—$COOZ_{12}$ groups wherein $Z_{12}$ has the same meanings defined above.

22. The stabilizing mixtures of claim 10 wherein said compounds (d') have general formula (XXVIIIC).

* * * * *